(12) United States Patent
Watola et al.

(10) Patent No.: US 12,282,169 B2
(45) Date of Patent: *Apr. 22, 2025

(54) HYBRID SEE THROUGH AUGMENTED REALITY SYSTEMS AND METHODS FOR LOW VISION USERS

(71) Applicant: Eyedaptic, Inc., Laguna Niguel, CA (US)

(72) Inventors: David Watola, Irvine, CA (US); Jay E. Cormier, Laguna Niguel, CA (US)

(73) Assignee: Eyedaptic, Inc., Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,373

(22) Filed: Oct. 20, 2023

(65) Prior Publication Data

US 2024/0061253 A1 Feb. 22, 2024

Related U.S. Application Data

(63) Continuation of application No. 17/849,028, filed on Jun. 24, 2022, now Pat. No. 11,803,061, which is a continuation of application No. 17/537,193, filed on Nov. 29, 2021, now Pat. No. 11,385,468, which is a continuation of application No. 17/057,181, filed as
(Continued)

(51) Int. Cl.
*G02B 27/01* (2006.01)
*G06T 5/70* (2024.01)

(52) U.S. Cl.
CPC ............ *G02B 27/0172* (2013.01); *G06T 5/70* (2024.01); *G02B 2027/0138* (2013.01); *G02B 2027/0147* (2013.01); *G02B 2027/0178* (2013.01)

(58) Field of Classification Search
CPC ........ G02B 27/0172; G02B 2027/0138; G02B 2027/0147; G02B 2027/0178; G06T 5/70
See application file for complete search history.

(56) References Cited

U.S. PATENT DOCUMENTS

| 5,546,099 A | 8/1996 | Quint et al. |
| 5,777,715 A | 7/1998 | Kruegle et al. |
| 5,892,570 A | 4/1999 | Stevens |

(Continued)

FOREIGN PATENT DOCUMENTS

| CA | 2916780 A1 | 10/2008 |
| CA | 164180 S | 9/2016 |

(Continued)

OTHER PUBLICATIONS

Carroll et al.; Visual field testing:from one medical student to another; 18 pages; retrieved from the internet (http://eyerounds.org/tutorials/VF-testing/); Aug. 22, 2013.

(Continued)

*Primary Examiner* — Ricardo Osorio
(74) *Attorney, Agent, or Firm* — Shay Glenn LLP

(57) ABSTRACT

Provided herein are augmented reality visual aid systems, software, and methods which enhance vision, to simulate natural vision, by utilizing hybrid see through occlusion enabled hardware, and software through image manipulation, reprocessing, blending, for presentation and display to the eyes thus enabling a range of tasks previously lost or impacted.

10 Claims, 13 Drawing Sheets

Related U.S. Application Data application No. PCT/US2019/034443 on May 29, 2019, now Pat. No. 11,187,906.

(60) Provisional application No. 62/677,463, filed on May 29, 2018.

(56) References Cited

U.S. PATENT DOCUMENTS

| | | | |
|---|---|---|---|
| 6,418,122 | B1 | 7/2002 | Schoenblum et al. |
| 8,135,227 | B2* | 3/2012 | Lewis .................... G16H 30/40 |
| | | | 382/128 |
| 8,384,999 | B1 | 2/2013 | Crosby |
| 8,976,086 | B2 | 3/2015 | Hilkes |
| 9,516,283 | B2 | 12/2016 | Hilkes et al. |
| 9,618,748 | B2* | 4/2017 | Munger ................ H04N 13/239 |
| 9,782,084 | B2 | 10/2017 | Maertz |
| 10,091,414 | B2 | 10/2018 | Chan et al. |
| 10,347,048 | B2 | 7/2019 | Fu et al. |
| 10,397,560 | B2 | 8/2019 | Miyao et al. |
| 10,429,675 | B2 | 10/2019 | Greget |
| 10,564,714 | B2 | 2/2020 | Marggraff et al. |
| 10,869,026 | B2 | 12/2020 | Gupta |
| 10,872,472 | B2 | 12/2020 | Watola et al. |
| 10,950,049 | B1 | 3/2021 | Kelly et al. |
| 10,963,999 | B2 | 3/2021 | Werblin et al. |
| 10,984,508 | B2 | 4/2021 | Kim et al. |
| 11,016,302 | B2 | 5/2021 | Freeman et al. |
| 11,030,975 | B2 | 6/2021 | Nishibe et al. |
| 11,031,120 | B1 | 6/2021 | Freeman, deceased et al. |
| 11,043,036 | B2 | 6/2021 | Kim et al. |
| 11,132,055 | B2 | 9/2021 | Jones et al. |
| 11,187,906 | B2 | 11/2021 | Watola et al. |
| 11,282,284 | B2 | 3/2022 | Watola et al. |
| 11,372,479 | B2 | 6/2022 | Bradley et al. |
| 11,385,468 | B2 | 7/2022 | Watola et al. |
| 11,521,360 | B2 | 12/2022 | Kim et al. |
| 11,546,527 | B2 | 1/2023 | Werblin et al. |
| 11,563,885 | B2 | 1/2023 | Watola et al. |
| 11,676,152 | B2 | 6/2023 | Watola et al. |
| 11,676,352 | B2 | 6/2023 | Watola et al. |
| 11,726,561 | B2 | 8/2023 | Watola et al. |
| 11,756,168 | B2 | 9/2023 | Kim et al. |
| 11,803,061 | B2 | 10/2023 | Watola et al. |
| 11,819,273 | B2 | 11/2023 | Freeman et al. |
| 11,956,414 | B2 | 4/2024 | Freeman et al. |
| 12,062,430 | B2 | 8/2024 | Riggs et al. |
| 2007/0200927 | A1 | 8/2007 | Krenik |
| 2008/0013047 | A1 | 1/2008 | Todd et al. |
| 2008/0247620 | A1 | 10/2008 | Lewis et al. |
| 2008/0309878 | A1 | 12/2008 | Hirji |
| 2009/0273758 | A1 | 11/2009 | Wang et al. |
| 2011/0043644 | A1 | 2/2011 | Munger et al. |
| 2011/0109876 | A1 | 5/2011 | Reichow et al. |
| 2011/0181692 | A1 | 7/2011 | Kuno |
| 2011/0227813 | A1 | 9/2011 | Haddick et al. |
| 2011/0285960 | A1 | 11/2011 | Kohn et al. |
| 2012/0206452 | A1 | 8/2012 | Geisner et al. |
| 2012/0242865 | A1 | 9/2012 | Vartanian et al. |
| 2012/0309529 | A1 | 12/2012 | Westlund et al. |
| 2013/0021373 | A1 | 1/2013 | Vaught et al. |
| 2013/0127980 | A1 | 5/2013 | Haddick et al. |
| 2013/0215147 | A1 | 8/2013 | Hilkes et al. |
| 2014/0002475 | A1 | 1/2014 | Oh |
| 2014/0053111 | A1 | 2/2014 | Beckman |
| 2014/0063062 | A1 | 3/2014 | Fateh |
| 2014/0152530 | A1 | 6/2014 | Venkatesha et al. |
| 2014/0210970 | A1 | 7/2014 | Dalal et al. |
| 2015/0002808 | A1 | 1/2015 | Rizzo, III et al. |
| 2015/0355481 | A1* | 12/2015 | Hilkes .................... A61B 3/04 |
| | | | 351/227 |
| 2016/0033771 | A1 | 2/2016 | Tremblay et al. |
| 2016/0037025 | A1 | 2/2016 | Blum |
| 2016/0041615 | A1 | 2/2016 | Ikeda |
| 2016/0085302 | A1 | 3/2016 | Publicover et al. |
| 2016/0116979 | A1 | 4/2016 | Border |
| 2016/0156850 | A1* | 6/2016 | Werblin .................. G06F 3/013 |
| | | | 348/63 |
| 2016/0171779 | A1 | 6/2016 | Bar-Zeev et al. |
| 2016/0178912 | A1 | 6/2016 | Kusuda et al. |
| 2016/0180591 | A1 | 6/2016 | Shiu et al. |
| 2016/0187654 | A1 | 6/2016 | Border et al. |
| 2016/0187969 | A1 | 6/2016 | Larsen et al. |
| 2016/0216515 | A1 | 7/2016 | Bouchier et al. |
| 2016/0235291 | A1 | 8/2016 | Goh et al. |
| 2016/0246057 | A1 | 8/2016 | Hasegawa et al. |
| 2016/0264051 | A1 | 9/2016 | Werblin |
| 2016/0270648 | A1 | 9/2016 | Freeman et al. |
| 2016/0270656 | A1 | 9/2016 | Samec et al. |
| 2016/0274381 | A1 | 9/2016 | Haddadi |
| 2016/0314564 | A1 | 10/2016 | Jones et al. |
| 2016/0349509 | A1 | 12/2016 | Lanier et al. |
| 2016/0363770 | A1 | 12/2016 | Kim et al. |
| 2016/0377865 | A1 | 12/2016 | Alexander et al. |
| 2017/0068119 | A1 | 3/2017 | Antaki et al. |
| 2017/0084203 | A1 | 3/2017 | Aguren |
| 2017/0176748 | A1 | 6/2017 | Kim |
| 2017/0185723 | A1 | 6/2017 | McCallum et al. |
| 2017/0200296 | A1 | 7/2017 | Jones et al. |
| 2017/0221264 | A1 | 8/2017 | Perry |
| 2017/0235161 | A1* | 8/2017 | Hilkes .................... G02C 5/124 |
| | | | 351/204 |
| 2017/0249862 | A1 | 8/2017 | Border |
| 2017/0273552 | A1 | 9/2017 | Leung et al. |
| 2017/0287222 | A1 | 10/2017 | Fujimaki |
| 2017/0343822 | A1 | 11/2017 | Border et al. |
| 2017/0365101 | A1 | 12/2017 | Samec et al. |
| 2017/0372225 | A1 | 12/2017 | Foresti |
| 2018/0005419 | A1 | 1/2018 | Hao et al. |
| 2018/0052326 | A1 | 2/2018 | Wall et al. |
| 2018/0077409 | A1 | 3/2018 | Heo et al. |
| 2018/0103917 | A1 | 4/2018 | Kim et al. |
| 2018/0104106 | A1 | 4/2018 | Lee et al. |
| 2018/0144554 | A1 | 5/2018 | Watola et al. |
| 2018/0150132 | A1 | 5/2018 | Xiao et al. |
| 2018/0203231 | A1 | 7/2018 | Glik et al. |
| 2018/0217380 | A1 | 8/2018 | Nishimaki et al. |
| 2018/0249151 | A1 | 8/2018 | Freeman et al. |
| 2018/0365877 | A1 | 12/2018 | Watola et al. |
| 2019/0012841 | A1 | 1/2019 | Kim et al. |
| 2019/0041642 | A1 | 2/2019 | Haddick et al. |
| 2019/0204113 | A1* | 7/2019 | He ...................... G01C 21/1656 |
| 2019/0279407 | A1 | 9/2019 | McHugh et al. |
| 2019/0302886 | A1* | 10/2019 | Werblin .................. G06F 3/011 |
| 2019/0331920 | A1 | 10/2019 | Watola et al. |
| 2019/0331922 | A1 | 10/2019 | Kim et al. |
| 2019/0339528 | A1 | 11/2019 | Freeman et al. |
| 2019/0385342 | A1 | 12/2019 | Freeman et al. |
| 2020/0371311 | A1 | 11/2020 | Lobachinsky et al. |
| 2021/0022599 | A1 | 1/2021 | Freeman et al. |
| 2021/0257084 | A1 | 8/2021 | Freeman et al. |
| 2021/0271318 | A1 | 9/2021 | Bradley et al. |
| 2022/0005587 | A1 | 1/2022 | Freeman et al. |
| 2022/0171456 | A1 | 6/2022 | Siddiqi et al. |
| 2023/0274507 | A1 | 8/2023 | Kim et al. |
| 2023/0276122 | A1 | 8/2023 | Watola et al. |
| 2023/0419623 | A1 | 12/2023 | Watola et al. |

FOREIGN PATENT DOCUMENTS

| | | |
|---|---|---|
| CA | 3043204 C | 8/2021 |
| CA | 2991644 A1 | 3/2022 |
| CA | 3084546 C | 1/2023 |
| CA | 3069173 C | 5/2023 |
| CN | 104076513 A | 10/2014 |
| CN | 104306102 A | 1/2015 |
| CN | 105930819 A | 9/2016 |
| CN | 112534467 A | 3/2021 |
| CN | 108475001 B | 6/2021 |
| CN | 114063302 A | 2/2022 |
| CN | 107121070 B | 3/2023 |
| EP | 2674805 A2 | 12/2013 |
| EP | 3830630 A4 | 1/2023 |
| EP | 2621169 B1 | 7/2023 |

(56) References Cited

FOREIGN PATENT DOCUMENTS

| JP | 2017049916 A | 3/2017 |
|---|---|---|
| JP | 2017120550 A | 7/2017 |
| KR | 20140066258 A | 5/2014 |
| WO | WO2008/119187 A1 | 10/2008 |
| WO | WO2011/060525 A1 | 5/2011 |
| WO | WO2013/120180 A1 | 8/2013 |
| WO | WO2013/177654 A1 | 12/2013 |
| WO | WO2014/107261 A1 | 7/2014 |
| WO | WO2016/036860 A1 | 3/2016 |
| WO | WO2016/077343 A1 | 5/2016 |
| WO | WO2016/144419 A1 | 9/2016 |
| WO | WO2016/149536 A1 | 9/2016 |
| WO | WO2016/168913 A1 | 10/2016 |
| WO | WO2017/059522 A1 | 4/2017 |
| WO | WO2018/200717 A1 | 11/2018 |
| WO | WO2020/014705 A1 | 1/2020 |
| WO | WO2020/014707 A1 | 1/2020 |
| WO | WO2021/003406 A1 | 1/2021 |

OTHER PUBLICATIONS

Gonzalez; Advanced Imaging in Head-Mounted Displays for Patients with Age-Related Macular Degeneration; Doctoral dissertation; Technical University of Munich; p. 1-129; 2011 (the year of publication is sufficiently earlier than the effective U.S. filing date and any foreign priority date so that the particular month of publication is not in issue).

Hwang et al.; An augmented-reality edge enhancement application for Google Glass; Optometry and vision science; 91(8); pp. 1021-1030; Aug. 1, 2014.

Nomoto et al.; Prototype and evaluation of magnifying reader using image processing; Proceedings of the 2011 JSME Conference on Robotics and Mechatronics; The Japan Society of Mechanical Engineers; pp. 2784-2785; (Abstract Only) May 2011.

Unser et al.; B-spline signal processing: Part II—efficient design and applicationtions; IEEE Transactions on Signal Processing; 41(2); pp. 834-848; Feb. 1993.

Unser et al.; B-spline signal processing: part I—theory; IEEE Transactions on Signal Processing: 41(2)); pp. 821-832; Feb. 1993.

Unser et al.; TheL2 polynomial spline pyramid; IEEE Transactions on Pattern Analysis and Machine Intelligence; 15(4); pp. 364-379; Apr. 1993.

Unser; Splines—a perfect fit for signal and image processing; IEEE Signal Processing Magazine; 16 (Article); pp. 22-38; Nov. 1999.

Watola et al.; U.S. Appl. No. 18/344,337 entitled "Enhanced autonomous hands-free control in electronic visual aids," filed Jun. 29, 2023.

Watola et al.; U.S. Appl. No. 18/675,974 entitled "Systems for augmented reality visual aids and tools," filed May 28, 2024.

* cited by examiner

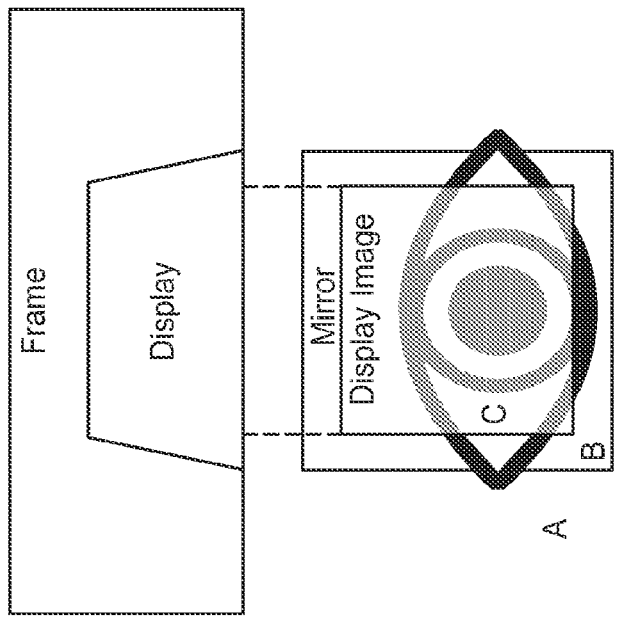
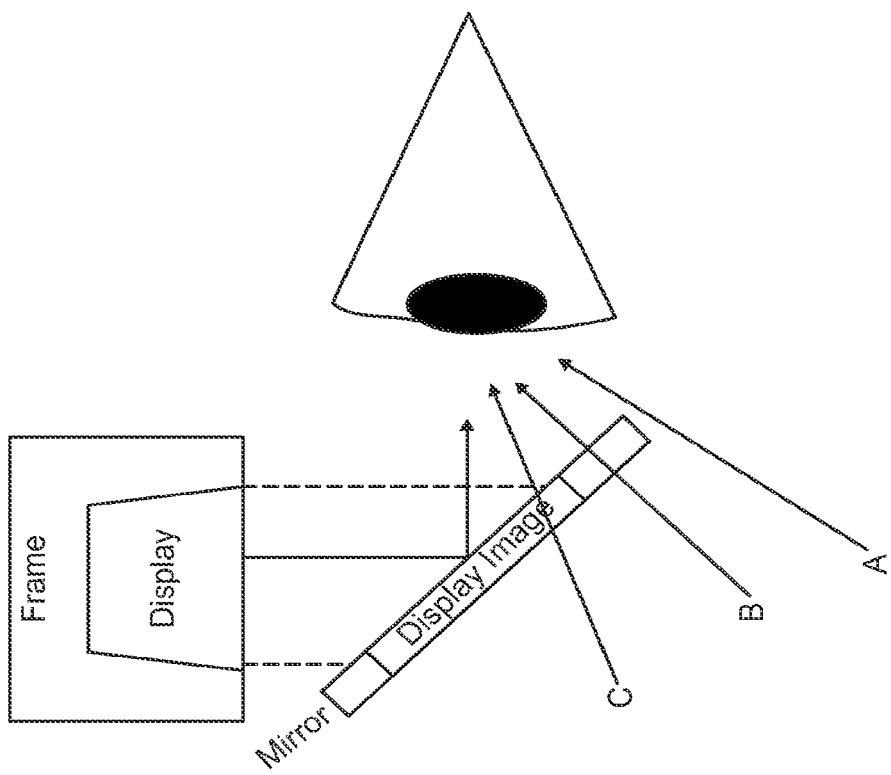
FIG. 1B
FIG. 1A

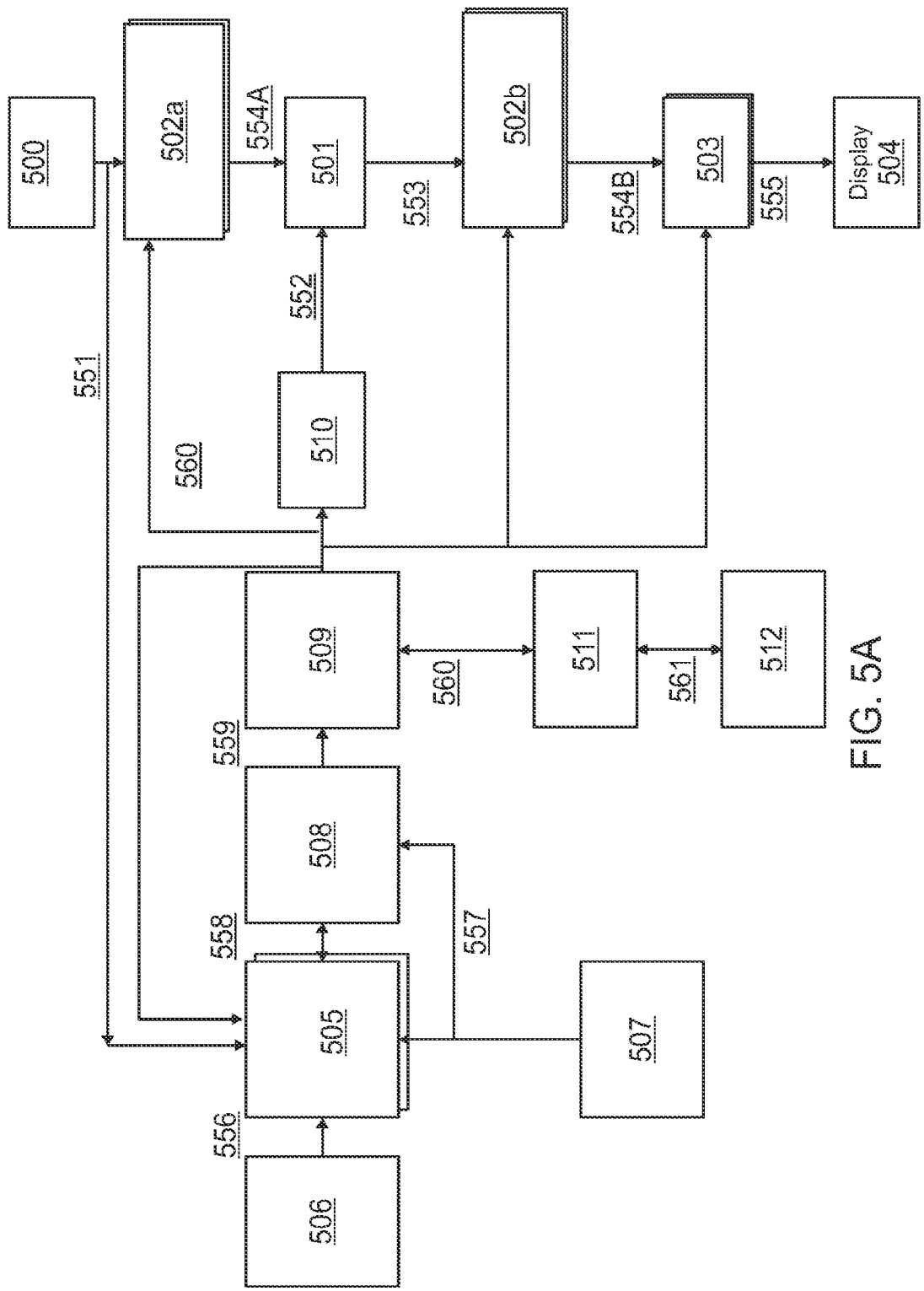

HYBRID SEE THROUGH AUGMENTED REALITY SYSTEMS AND METHODS FOR LOW VISION USERS

CROSS REFERENCE TO RELATED APPLICATIONS

This application is a continuation of U.S. application Ser. No. 17/849,028, filed Jun. 24, 2022, which is a continuation of U.S. application Ser. No. 17/537,193, filed Nov. 29, 2021, now U.S. Pat. No. 11,385,468, which is a continuation of U.S. application Ser. No. 17/057,181, filed Nov. 20, 2020, now U.S. Pat. No. 11,187,906, which application is the U.S. national phase of International Application No. PCT/US2019/034443, filed May 29, 2019, which claims benefit of priority to U.S. Provisional Patent Application No. 62/677,463, filed May 29, 2018, titled "Hybrid See Through Augmented Reality Suitable for Low Vision Users," herein incorporated by reference in their entirety.

This application is related to U.S. Appln. No. 62/530,286, filed Jul. 9, 2017, U.S. Appln. No. 62/530,792, filed Jul. 10, 2017, U.S. Appln. No. 62/579,657, filed Oct. 31, 2017, U.S. Appln. No. 62/579,798, filed Oct. 31, 2017, International Appln. No. PCT/US17/062421, filed Nov. 17, 2017, U.S. application Ser. No. 15/817,117, filed Nov. 17, 2017, U.S. Appln. No. 62/639,347, filed Mar. 6, 2018, U.S. application Ser. No. 15/918,884, filed Mar. 12, 2018, U.S. Appln. No. 62/735,643, filed Sep. 24, 2018, and U.S. Appln. No. 16/177,333, filed Oct. 31, 2018, the contents of which are incorporated herein by reference herein in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Head mounted visual aids have been used for hundreds of years, and as in the past are commonly optics-based solutions such as eyeglasses. The conceptualization and early experimentation with programmable head mounted electronic based visual aids began with NASA-funded research in the late 1980s. Basic functionality described included remapping of pixels in order to manipulate the image presented to the wearer's eye. The remapping described was primarily forms of magnification and warping of the image with different shapes, sizes and positions of the modified area. Although early experiments proved noteworthy for several retinal based diseases, ultimately the research proved impractical at the time for a variety of reasons.

Current hardware implementations of wearable head mounted devices have become more common, with Virtual Reality (VR) headsets and Augmented Reality (AR) glasses becoming mainstream. These platforms were designed and intended for use in a number of applications such as gaming, telepresence and a wide variety of enterprise applications. This enabling technology also provides a potential fruitful basis for more advanced image processing for the low vision user. However, neither approach is ideal for the low vision user, and requires further refinement along with novel software and algorithms to work seamlessly together to make the head mounted wearable practical and useful for the low vision user.

SUMMARY

The inventions described herein relate to improved hardware and integrated software and algorithms for a class of wearable electronic Augmented Reality (AR) glasses in general, with additional specific benefits for low-vision users suffering from various visual impairments (e.g., Age-related Macular Degeneration—AMD—and other visual field deficiencies). The presented adjustments to pre-existing AR glass designs resolve a problem previously addressed by brute-force methods that ultimately reduce the usability and versatility of the glasses. By instead acknowledging and understanding the underlying phenomenology, the updated approach establishes a new AR paradigm that further enhances the experience of low-vision users without sacrificing key benefits of the standard design. In certain applications, normally-sighted users will also benefit from these changes.

Present Augmented Reality (AR) eyewear implementations fall cleanly into two disjoint categories, video see-through (VST) and optical see-through (OST).

Apparatuses for VST AR closely resembles Virtual Reality (VR) gear, where the wearer's eyes are fully enclosed so that only content directly shown on the embedded display is visible. VR systems maintain a fully-synthetic three-dimensional environment that must be continuously updated and rendered at tremendous computational cost. VST AR glasses also fully enclose the eyes, but instead present imagery based on the real-time video feed from an appropriately-mounted camera (or cameras) directed along the user's eyeline; hence the data and problem domain are fundamentally two-dimensional. Like VR, VST AR provides absolute control over the final appearance of visual stimulus, and facilitates registration and synchronization of captured video with any synthetic augmentations. Very wide fields-of-view (FOV) approximating natural human limits are also achievable at low cost. However, VST gear tends to be bulky and incur additional latencies associated with image capture. Furthermore, complete immersion of the user also results of loss of peripheral vision and hence mobility that requires peripheral vision; it is also commonly associated with side effects such as dizziness and nausea caused by unanchoring from reality. VST in the VR domain also can have the drawback of a sharp demarcation if the field of view is not sufficient to cover the entire area of interest for the user.

OST AR eyewear, on the other hand, has a direct optical path allowing light from the scene to form a natural image on the retina. This natural image is essentially the same one that would be formed without AR glasses, possibly with some loss of brightness due to attenuation by optical components. A camera is used to capture the scene for automated analysis, but its image does not need to be shown to the user. Instead, computed annotations or drawings from an internal display are superimposed onto the natural retinal image by any of a number of established optical combining methods, (e.g.) direct laser projection onto the retina, electronic contact lenses, birdbath optics, or a half-silvered minor for optical combining. In a traditional OST AR application, the majority of the display typically remains blank (i.e. black) to avoid contributing any photons to the final retinal image; displayed augmentations produce sufficient light to be visible against the natural image background. The horizontal field-of-view over which annotations can be projected tends to be limited to a central 25 to 50 degrees, but there is no delay between real-world events and their perception. Furthermore, the scene image has no artifacts due to image-sensor sampling, capture, or processing. However, synchronizing augmentations becomes more challenging and user-dependent calibration may be needed to ensure proper their registration. Finally, OST possesses an inherent degree of safety that VST lacks: if the OST hardware fails, the user can still see the environment. However, direct OST is often confusing for low vision users due to the difficulty of resolving the double image resulting from the AR overlay.

The primary task of visual-assistance eyewear for low-vision sufferers does not match the most common use model for AR (whether VST or OST), which involves superimposing annotations or drawings on a background image that is otherwise faithful to the objective reality that would be seen by the unaided eye. Instead, assistive devices must dramatically change how the environment is displayed in order to compensate defects in the user's vision. Processing may include such effects as contrast enhancement and color mapping, but invariably incorporates increased magnification to counteract deficient visual acuity. Existing devices for low-vision are magnification-centric, and hence operate in the VST regime with VST hardware. Some use OST-based AR platforms, but install opaque lens covers that completely block all environmental light from entering the retina—since a camera supplies the only visible image via an internal display, they become exclusively VST systems.

The inventions described here instead employ a unique combined VST/OST methodology (hybrid see-through, or HST) to produce a final retinal image. Doing so permits the best characteristics of each technique to be effectively exploited while simultaneously avoiding or ameliorating undesirable aspects. Specifically:

The wide field of view associated with VST can be maintained for the user in spite of the narrow active display area of the OST-based image;

Absolute control over the final retinal image details is achieved (as in VST) for the highest-acuity central area covered by the internal display;

Additional blending of the augmented image and the real world can be accomplished through software that performs non-linear transformations and image remapping to avoid harsh and abrupt transitions between the processed image and unmodified reality A fail-safe vision path exists at all times (as in OST), regardless of the content of the internal display—and whether or not that display is functioning;

Difficulty of resolving focus ambiguities between natural images and OST overlays in low-vision users is addressed and remedied.

A hybrid see-through augmented reality device is provided, comprising a frame configured to be worn on the head of a user, a camera disposed on the frame and configured to generate unprocessed real-time video images, a first display disposed within the frame and including a first barrier configured to substantially prevent external light corresponding to a central portion of the user's field of view from entering a first eye of the user while allowing external light corresponding to a peripheral portion of the user's field of view to enter the first eye of the user, a processor disposed on or in the frame and configured to process the real-time video images from the camera to produce a video stream that, when displayed on the first display, replaces the central portion of the user's field of view while blending with the peripheral portion of the user's field of view.

In some aspects, the device further includes a second display disposed within the frame and including a second barrier configured to substantially prevent external light corresponding to the central portion of the user's field of view from entering a second eye of the user while allowing external light corresponding to the peripheral portion of the user's field of view to enter the second eye of the user.

In one example, the processor is also configured to display the video stream on the second display.

In another example, the processor is configured to process the unprocessed real-time video images to produce the video stream that is enhanced when compared to the unprocessed real-time video images. The enhanced video stream can be at least partially magnified when compared to the unprocessed real-time video images. In some examples, the video stream is magnified in a central portion of the video stream. In another example, a portion of the video stream outside of the central portion is magnified less than the central portion but more than the unprocessed real-time video images.

In one example, the processor is configured to process the unprocessed real-time video images to blend a top edge, a bottom edge, a left edge, and a right edge of the video stream with the peripheral portion of the user's field of view. In another example, the processor is configured to process the unprocessed real-time video images to blend only a left edge and a right edge of the video stream with the peripheral portion of the user's field of view.

In some examples, the processor is configured to process the unprocessed real-time video with image coordinate remapping to blend the video stream with the peripheral portion of the user's field of view. In some examples, the image coordinate remapping comprises radial mapping.

In one example, the device further comprises an input device configured to receive an input from the user regarding a type and/or an amount of enhancement to apply to the unprocessed real-time video images. In some examples, the input device comprises a physical mechanism. In other examples, the input device comprises a microphone disposed on or in the housing configured to receive voice commands from the user.

A method of providing enhanced vision for a low-vision user is also provided, comprising generating unprocessed real-time video images with a head mounted camera, preventing light corresponding to a central portion of the user's field of view from entering a first eye of the user, processing the unprocessed real-time video images to produce a video stream that corresponds to the central portion of the user's field of view and blends with a peripheral portion of the user's field of view, and displaying the video stream on a display positioned within the central portion of the user's field of view that substantially prevents external light corresponding to the central portion of the user's field of view from entering the first eye of the user while allowing external light corresponding to the peripheral portion of the user's field of view to enter the first eye of the user.

In some examples, the method further comprises displaying the video stream on a second display positioned within the central portion of the user's field of view. In one example, the display is positioned in front of the first eye of the user and the second display is positioned in front of a second eye of the user.

In other examples, the method further comprises processing the unprocessed real-time video images such that the video stream is enhanced when compared to the unprocessed real-time video images. In one example, the enhanced video stream is at least partially magnified when compared to the unprocessed real-time video images. In another example, the enhanced video stream is magnified in a central portion of the video stream. In one example, a portion of the video stream outside of the central portion is magnified less than the central portion but more than the unprocessed real-time video images.

In some examples the method further comprises processing the unprocessed real-time video images to blend a top edge, a bottom edge, a left edge, and a right edge of the video stream with the peripheral portion of the user's field of view. In other examples the method further comprises processing the unprocessed real-time video images to blend only a left edge and a right edge of the video stream with the peripheral portion of the user's field of view.

In some examples, the method further comprises processing the unprocessed real-time video with image coordinate remapping to blend the video stream with the peripheral portion of the user's field of view. In one example, the image coordinate remapping comprises radial mapping.

A non-transitory computing device readable medium is also provided, the medium having instructions stored thereon that are executable by a processor to cause a computing device to generate unprocessed real-time video images, process the unprocessed real-time video images to produce a video stream that corresponds to a central portion of a user's field of view and blends seamlessly with a peripheral portion of the user's field of view, display the video stream on a display positioned within the central portion of the user's field of view that substantially prevents external light corresponding to the central portion of the user's field of view from entering a first eye of the user while allowing external light corresponding to the peripheral portion of the user's field of view to enter the first eye of the user.

In some examples, the instructions further cause the computing device to display the video stream on a second display positioned within the central portion of the user's field of view.

In one example, the display is positioned in front of the first eye of the user and the second display is positioned in front of a second eye of the user.

In other examples, the instructions further cause the computing device to process the unprocessed real-time video images such that the video stream is enhanced when compared to the unprocessed real-time video images. In one example, the enhanced video stream is at least partially magnified when compared to the unprocessed real-time video images. In another example, the enhanced video stream is magnified in a central portion of the video stream.

In one example, a portion of the video stream outside of the central portion is magnified less than the central portion but more than the unprocessed real-time video images.

In some examples, the instructions further cause the computing device to process the unprocessed real-time video images to blend a top edge, a bottom edge, a left edge, and a right edge of the video stream with the peripheral portion of the user's field of view. In another example, the instructions further cause the computing device to process the unprocessed real-time video images to blend only a left edge and a right edge of the video stream with the peripheral portion of the user's field of view.

In some examples, the instructions further cause the computing device to process the unprocessed real-time video with image coordinate remapping to blend the video stream with the peripheral portion of the user's field of view. In one example, the image coordinate remapping comprises radial mapping.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A illustrates the three types of light rays considered in the formulation of the Hybrid See Through (HST) Augmented Reality (AR) methodology, depicting them in the context of a simple eyeglass-like Optical See Through (OST) AR wearable platform as viewed from the side.

FIG. 1B illustrates the OST AR wearable platform of FIG. 1A, as viewed from the front (i.e. looking directly at the wearer of the OST AR wearable platform).

FIG. 5A is a high-level dataflow diagram showing how data, controls, and state interact with the main components of a HST device to perform effective low-vision processing.

DETAILED DESCRIPTION

Figure 2A:
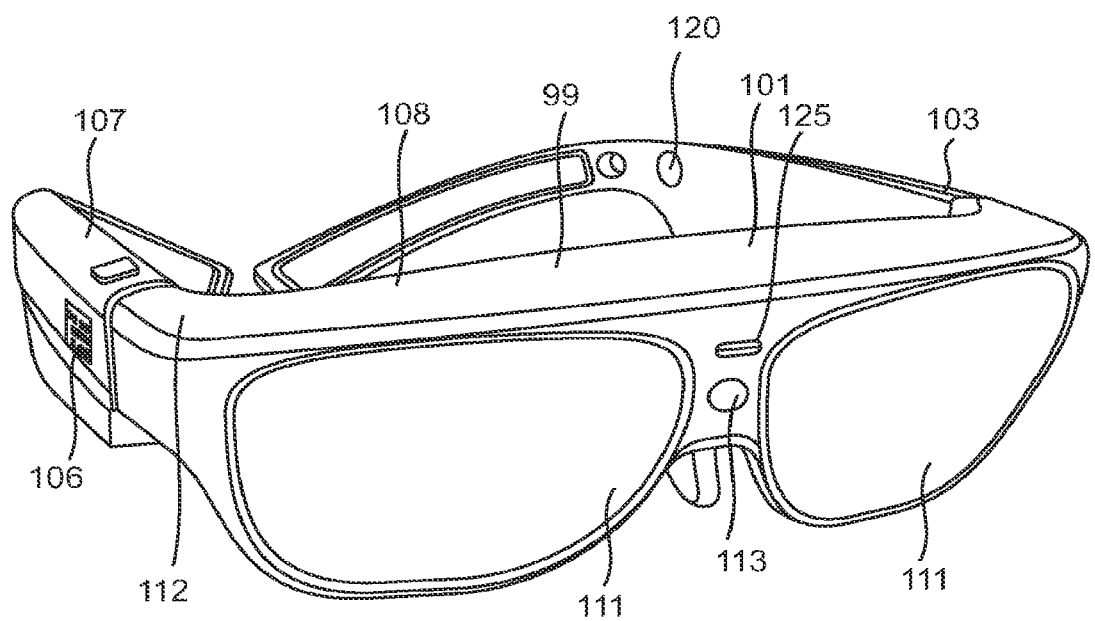
FIG. 2A is one example of a HST device according to the present disclosure.
Figure 2B:
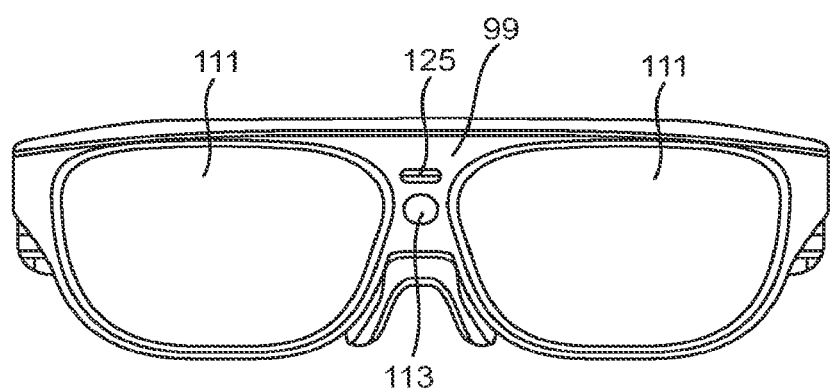
FIG. 2B is one example of a HST device according to the present disclosure.
Figure 2C:
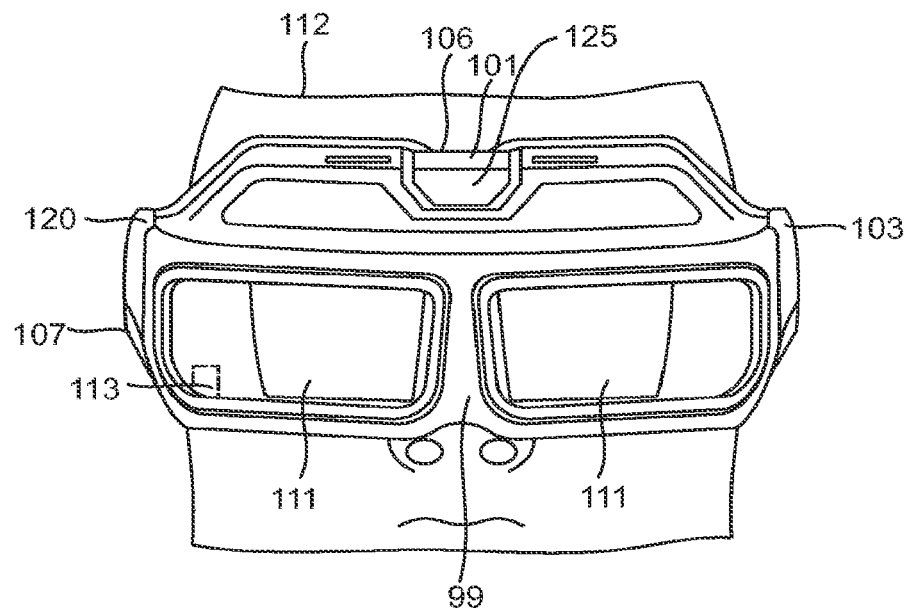
FIG. 2C is one example of a HST device according to the present disclosure.
Figure 2D:
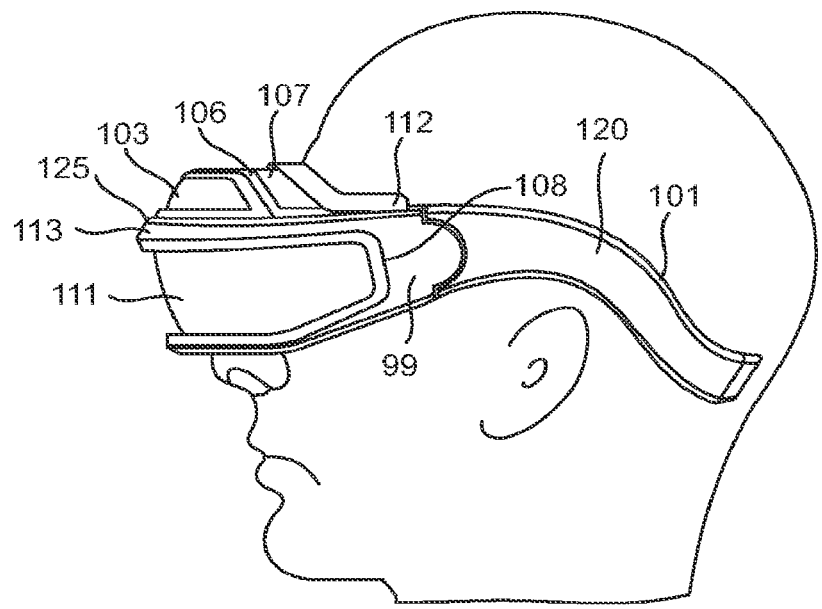
FIG. 2D is one example of a HST device according to the present disclosure.
Figure 2E:
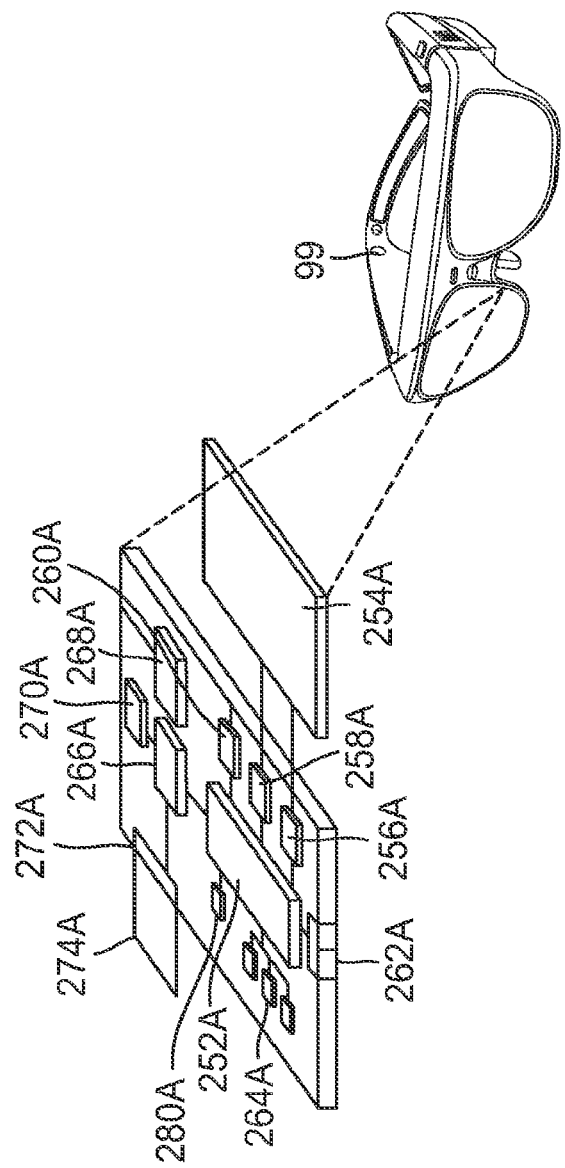
FIG. 2E is one example of a HST device, including some of the detailed components, according to the present disclosure.

The present disclosure is related to systems, methods, computing device readable media, and devices for providing enhanced vision to persons, users, or patients with low vision, particularly low vision in a center of the user's field of view (FOV).

For people with retinal diseases, adapting to loss of vision becomes a way of life. This impacts their lives in many ways including loss of the ability to read, loss of income, loss of mobility and an overall degraded quality of life. However, with prevalent retinal diseases such as AMD (Age-related Macular Degeneration) not all of the vision is lost, and in this case the peripheral vision remains intact as only the central vision is impacted by the degradation of the macula. Given that the peripheral vision remains intact it is possible to take advantage of eccentric viewing by enhancing and optimizing the peripheral vision while perceptually maintaining the FOV which otherwise decreases with increased magnification. By way of example these disease states may take the form of age-related macular degeneration, retinitis pigmentosa, diabetic retinopathy, Stargardt's disease, and other diseases where damage to part of the retina impairs vision. The present disclosure described herein is novel because it not only supplies systems and methods to enhance vision, but also provides simple but powerful hardware enhancements that work in conjunction with the software to provide a more natural field of view in conjunction with augmented images.

Hybrid see through (HST) devices as described herein can be constructed from a non-invasive, wearable electronics-based AR eyeglass system (see FIGS. 2A-2E) employing any of a variety of integrated display technologies, including LCD, OLED, or direct retinal projection. Materials are also able to be substituted for the "glass" having electronic elements embedded within the same, so that "glasses" may be understood to encompass for example, sheets of lens and camera containing materials, IOLs, contact lenses and the like functional units. These displays are placed in front of the eyes so as to readily display or project a modified or augmented image when observed with the eyes. This is commonly implemented as a display for each eye, but may also work for only one display as well as a continuous large display viewable by both eyes.

Referring now to FIGS. 2A-2E, HST device 99 is housed in a glasses frame model including both features and zones of placement which are interchangeable for processor 101, charging and dataport 103, dual display 111, control buttons 106, accelerometer gyroscope magnetometer 112, Bluetooth/Wi-Fi 108, autofocus camera 113, flashlight 125, and speaker/microphone combinations 120, known to those skilled in the art. For example, batteries 107, including lithium-ion batteries shown in a figure, or any known or developed other versions, functioning as a battery. Power management circuitry is contained within or interfaces with or monitors the battery to manage power consumption, control battery charging, and provide supply voltages to the various devices which may require different power requirements.

As shown in FIGS. 2A-2E, any basic hardware can be constructed from a non-invasive, wearable electronics-based AR eyeglass system (see FIGS. 2A-2E) employing any of a variety of integrated display technologies, including LCD, OLED, or direct retinal projection. Materials are also able to be substituted for the "glass" having electronic elements embedded within the same, so that "glasses" may be understood to encompass for example, sheets of lens and camera containing materials, IOLs, contact lenses and the like functional units.

One or more cameras (still, video, or both) 113, mounted on or within the glasses, are configured to continuously monitor the view where the glasses are pointing and continuously capture images that are stored, manipulated and used interactively in the HST device. In addition, one or more of these cameras may be IR (infrared) cameras for observation and monitoring in a variety of lighting conditions. The HST device can also contain an integrated processor or controller and memory storage (either embedded in the glasses, or tethered by a cable) with embedded software implementing real-time algorithms configured to modify the images as they are captured by the camera(s). These modified, or corrected, images are then continuously presented to the eyes of the user via the displays.

The processes described herein are implemented in a HST device configured to present an image or a real-time stream of video to the user. The processes may be implemented in computer programs (also known as programs, software, software applications or code) include machine instructions for a programmable processor, and can be implemented in a high-level procedural and/or object-oriented programming language, and/or in assembly/machine language, such as machine readable code or machine executable code that is stored on a memory and executed by a processor. Input signals or data is received by the unit from a user, cameras, detectors or any other device. Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input. Output is presented to the user in any manner, including a screen display or headset display. The processor and memory can be integral components of the HST device shown in FIGS. 2A-2D, or can be separate components linked to the HST device. Other devices such as mobile platforms with displays (cellular phones, tablets etc.) electronic magnifiers, and electronically enabled contact lens are also able to be used.

HST device 99 includes a processor 252A, memory 264A, an input/output device such as a display 254A, a communication interface 266A, and a transceiver 268A, along with other components. The device 99 may also be provided with a storage device, such as a Microdrive or other device, to provide additional storage. Each of the components of HST device 99, 252A, 264A, 254A, 266A, and 268A, are interconnected using various buses, and several of the components may be mounted on a common motherboard or in other manners as appropriate.

The processor 252A can execute instructions within the HST device 99, including instructions stored in the memory 264A. The processor may be implemented as a chipset of chips that include separate and multiple analog and digital processors. The processor may provide, for example, for coordination of the other components of the device 99, such as control of user interfaces, applications run by device 99, and wireless communication by device 99.

Processor 252A may communicate with a user through control interface 258A and display interface 256A coupled to a display 254A. The display 254A may be, for example, a TFT LCD (Thin-Film-Transistor Liquid Crystal Display) or an OLED (Organic Light Emitting Diode) display, or other appropriate display technology. The display interface 256A may comprise appropriate circuitry for driving the display 254A to present graphical, video and other information to a user. The control interface 258A may receive commands from a user and convert them for submission to the processor 252A. In addition, an external interface 262A may be provided in communication with processor 252A, so as to enable near area communication of device 99 with other devices. External interface 262A may provide for example, for wired communication in some implementations, or for wireless communication in other implementations, and multiple interfaces may also be used.

The memory 264A stores information within the HST device 99. The memory 264A can be implemented as one or more of a computer-readable medium or media, a volatile memory unit or units, or a non-volatile memory unit or units. Expansion memory 274A may also be provided and connected to device 99 through expansion interface 272A, which may include, for example, a SIMM (Single In Line Memory Module) card interface. Such expansion memory 274A may provide extra storage space for device 99, or may also store applications or other information for HST device 99. Specifically, expansion memory 274A may include instructions to carry out or supplement the processes described above, and may include secure information also. Thus, for example, expansion memory 274A may be provided as a security module for device 99, and may be programmed with instructions that permit secure use of device 99. In addition, secure applications may be provided via the SIMM cards, along with additional information, such as placing identifying information on the SIMM card in a non-backable manner. The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 264A, expansion memory 274A, or memory on processor 252A, that may be received, for example, over transceiver 268A or external interface 262A.

HST Device 99 may communicate wirelessly through communication interface 266A, which may include digital signal processing circuitry where necessary. Communication interface 266A may provide for communications under various modes or protocols, such as GSM voice calls, SMS, EMS, or MMS messaging, CDMA, TDMA, PDC, WCDMA, CDMA2000, GPRS, EDGE, 3G, 4G, 5G, AMPS, FRS, GMRS, citizen band radio, VHF, AM, FM, and wireless USB among others. Such communication may occur, for example, through radio-frequency transceiver 268A. In addition, short-range communication may occur, such as using a Bluetooth, Wi-Fi, or other such transceiver such as wireless LAN, WMAN, broadband fixed access or WiMAX. In addition, GPS (Global Positioning System) receiver module 270A may provide additional navigation- and location-related wireless data to device 99, and is capable of receiving and processing signals from satellites or other transponders to generate location data regarding the location, direction of travel, and speed, which may be used as appropriate by applications running on HST device 99.

HST device 99 may also communicate audibly using audio codec 260A, which may receive spoken information from a user and convert it to usable digital information. Audio codec 260A may likewise generate audible sound for a user, such as through a speaker, e.g., in a handset of device 99. Such sound may include sound from voice telephone calls, may include recorded sound (e.g., voice messages, music files, etc.) and may also include sound generated by applications operating on device 99. Part of the HST device is a speaker and microphone 120. The speaker and microphone may be controlled by the processor 252A and are configured to receive, generate and convert audio signals to electrical signals, in the case of the microphone, based on processor control.

An IMU (inertial measurement unit) 280A connects to the bus, or is integrated with other components, generates and provides data regarding the orientation of the HST device 99. This IMU can contain a compass, such as a magnetometer, an accelerometer and/or gyro, to provide directional data, impact and shock data or other information or data regarding shocks or forces experienced by the HST device.

A flasher and/or flashlight 125 are provided and are processor controllable. The flasher or flashlight may serve as a strobe or traditional flashlight, and may include an LED.

Thus, various implementations of the system and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Three aspects to HST implementation together engender its effectiveness in improving a user's vision: spatial partitioning, tailored image processing, and elimination of focus ambiguity. A detailed examination of these three benefits leads to the understanding of the advantages of the hardware changes that engender HST.

Spatial Partitioning

There are typically three types of viewing in an OST device, corresponding to three characteristically distinct paths for optical see through (OST) light rays as they travel from a viewed scene into an eye and onto its retina. Only two types are fundamentally different, but it is convenient for the purposes of this disclosure to distinguish the third.

Consider the drawings in FIGS. 1A-1B, which respectively depict side and front views of one eye within an OST AR wearable platform employing a half-silvered mirror as an example of an optical combiner to merge incoming scene light with the image shown on an internally-mounted display. In this example, the display is mounted in the top frame of the glasses and points downward such that the minor directs its reflected image into the eye; the same mirror allows light from the environment to pass directly through it into the eye. Other mounting orientations and optical combining strategies exist, including birdbath optics, electronic contact lenses, and direct laser projection, but this one adequately illustrates the three relevant types of light paths for all of them. Skilled practitioners will be able to identify analogous paths in all other OST platforms, regardless of architecture or implementation-specific details.

In both FIGS. 1A-1B, labels A, B, & C represent light rays originating in an environmental scene, directed toward the eye and travelling through the pupil and onto the retina. Label A indicates light that travels directly from the scene to the retina without intersecting any mirrors, other optical combiners, or non-trivial lenses. Labels B and C denote light that travels from the scene and into the retina, but only after passing through an optical combiner (which in this example is a half-silvered mirror) and/or any other incidental optical components upstream from the combiner.

The difference between the two is that C intersects the region of the combiner where the internal display also projects its output. Light from this display does not interact with scene light at the combiner, so there is no intrinsic difference between types B and C other than this simple fact of geometry. However, the importance of the distinction is clarified immediately below:

Type A. For portions of the field-of-view that are not within range of the internal display (and also not completely or partially blocked by mirrors or refracting/attenuating optics), a direct and natural light path from the scene to the retina exists. This OST path cannot actively participate in AR since the display cannot affect its retinal image, but its existence preserves the user's existing peripheral vision, aids in maintaining balance and equilibrium, and maintains a fail-safe degree of visual capability regardless of what the internal display is showing.

Type B. For portions of the field-of-view that intersect the combiner (a half-silvered mirror in this example) or other optical components, but do not overlap the projected internal display, there may be some loss of brightness due to attenuation as light rays of type B interact with these optical components. Type B rays are otherwise identical to light of type A, and can provide significant OST peripheral vision above, below, and beside the internally displayed image.

Type C. In a traditional AR application these light rays, which intersect the projection of the internal display onto the combiner, would be blended on the retina with the image presented on the display. In hybrid see through (HST), however, this combining process that merges light coming from two different directions—which is the very essence of OST AR—is deliberately prevented by the blocking type C light from reaching the combiner with an opaque barrier so that the central visual field of the user comprises only content originating in the display. Thus a defining paradigm is subverted, and OST eyewear locally takes on characteristics of video see through (VST) to form the HST architecture.

It is important to note that blocking type C rays has not been utilized or suggested in low vision applications. OST AR displays are typically capable of providing light power sufficient to overwhelm the direct scene image on retina, causing the brain to perceive only the dominant image. The additional utility granted by blocking type C light with an opaque barrier will be described in a later section.

It is the partitioning of angular space into explicit OST and VST regions that lends HST its name. The remaining two aspects serve to amplify its utility.

Tailored Image Processing

In a HST device, the image provided by the internal OST display replaces the natural retinal image that would normally be produced by type C light rays. The image from the display is derived in real-time from a mounted camera video stream with additional processing applied.

The specific processing used with HST is described and the relevant features for the present discussion include the following:

The internal display of a HST device contributes a dense replacement image for the entire central visual field of the user, not merely an overlay of sparse AR annotations;

Image processing is user-and-task specific, incorporating reconfigurable combinations selected from a large palette of individual image enhancements and modifications, but almost invariably contains some amount of magnification over at least a portion of its extent. Magnification over a portion of the field of view in an OST-style overlay is not viable for low-vision users due to the resulting misalignment between foreground and background scale.

Image processing for HST devices is dynamic and responsive. For example, the above-mentioned magnification can be interactively adjusted by the user, automatically calculated in response to the appearance of smaller or larger features (e.g. text, pictograms, or regularly structured objects (like a row of icons) in the camera image, or autonomously decided by an Artificial Intelligence (AI) or Machine Learning (ML) system that anticipates and executes user decisions by considering current conditions as well as historically observed user behavior. In general, all image modification capabilities can not only be adjusted but also enabled and disabled at will, with response times that appear nearly instantaneous to human users. All individual processing parameters, groups of interrelated or interdependent parameters, or entire operating modes and processing chains are subject to manual or autonomous manipulation in order to tailor the processing to the user's specified or inferred current needs.

In a HST device, the final displayed image is adjusted to blend smoothly into the peripheral areas of vision of the user (formed from light rays of type A and B) where the active display does not extend. An approximate blend that gradually reduces the image processing so that it is minimal at the edges of the display is sufficient to be perceived as essentially ideal. This forms the unique difference between HST and other forms of AR, including VST and OST: In HST, the video image provided by the display comprises the central portion of the user's field of view. Image processing techniques described herein are configured to blend the displayed image in the center of the field of view with the user's natural, unaltered peripheral vision to create enhanced vision for the user across the entire field of view.

Tailoring the central visual field to suit the user and current task leverages a hallmark capability of the VR paradigm—absolute control over the finest details of the retinal image—to provide flexible customization and utility where it is most needed. Whereas traditional OST AR produces displayed images that neatly coexist and integrate with the natural scene that they overlay, HST devices, systems, and methods must apply carefully-selected and painstakingly-tuned nonlinear distortions to satisfy their users. Careful blending between the display image and the user's peripheral vision restores a naturally wide field-of-view for a perceptually-seamless user experience despite the narrow active display region.

Figure 4A:
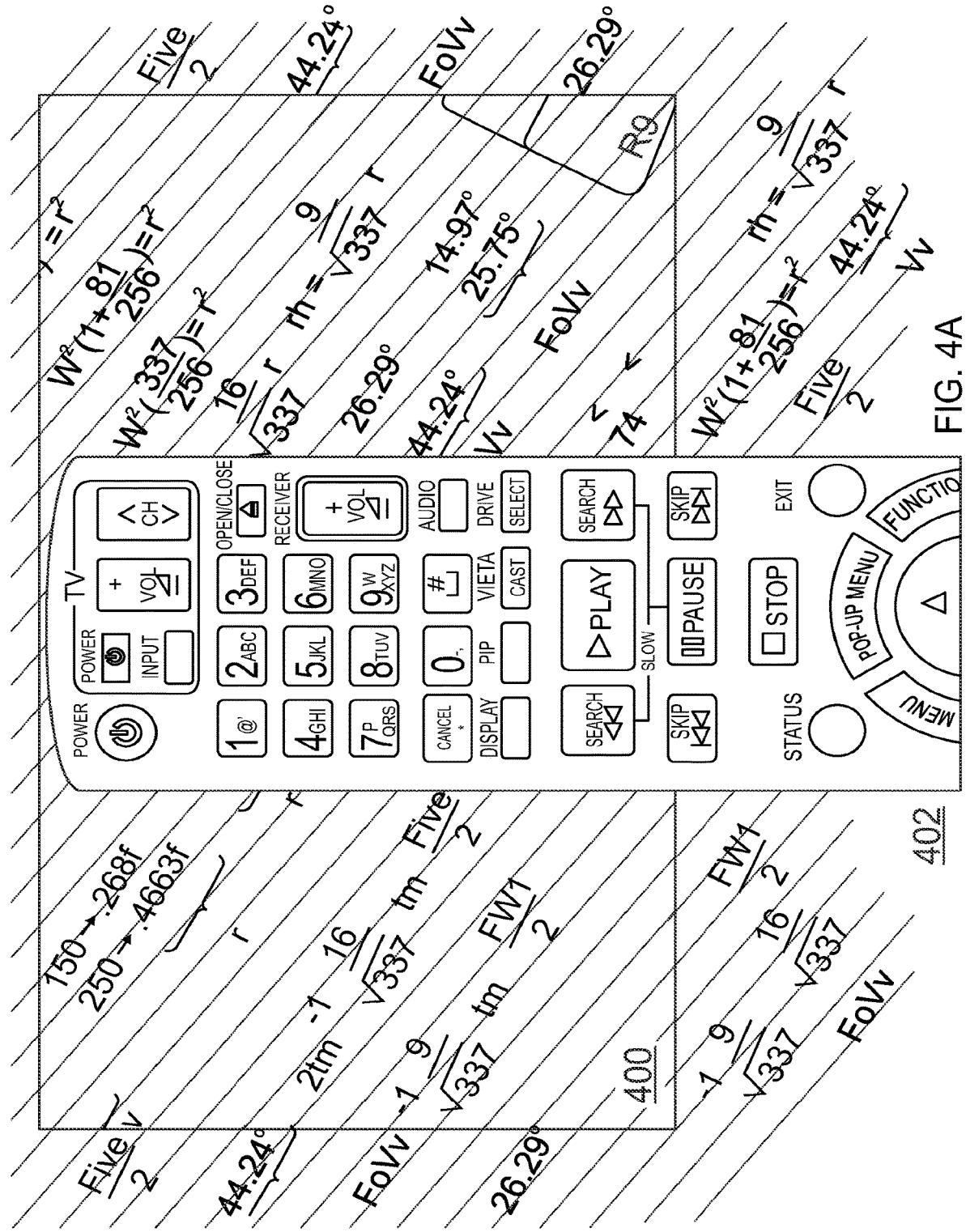
FIG. 4A contains a simulated view of a HST device with no processing except for a rectangle showing the picture of a display with 50-degree diagonal field-of-view
Figure 4B:
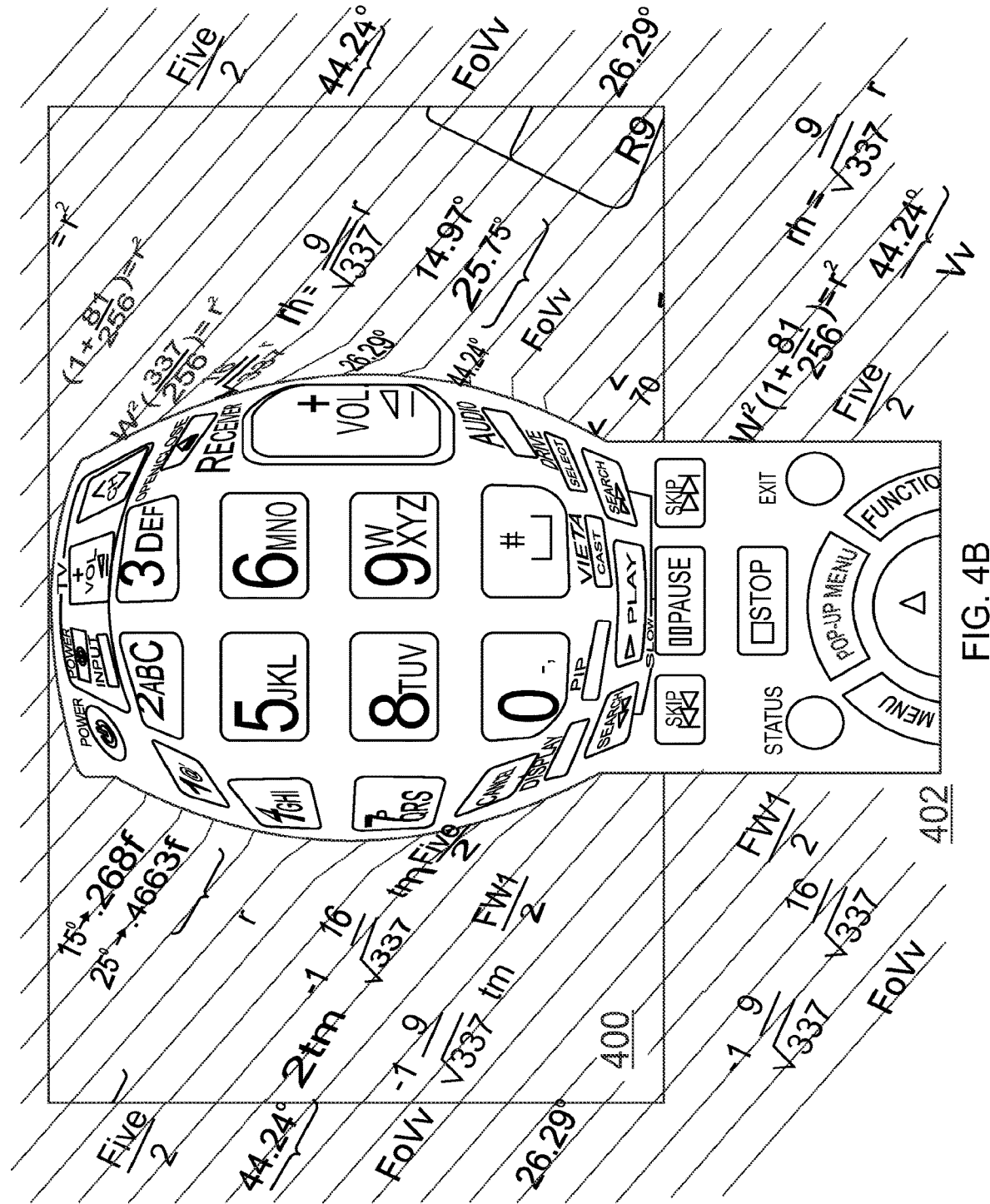
FIG. 4B shows the same view as FIG. 4A, but simulates processing that includes central magnification with seamless transitions between images at the edge of the display and objects outside of the display.
Figure 4C:
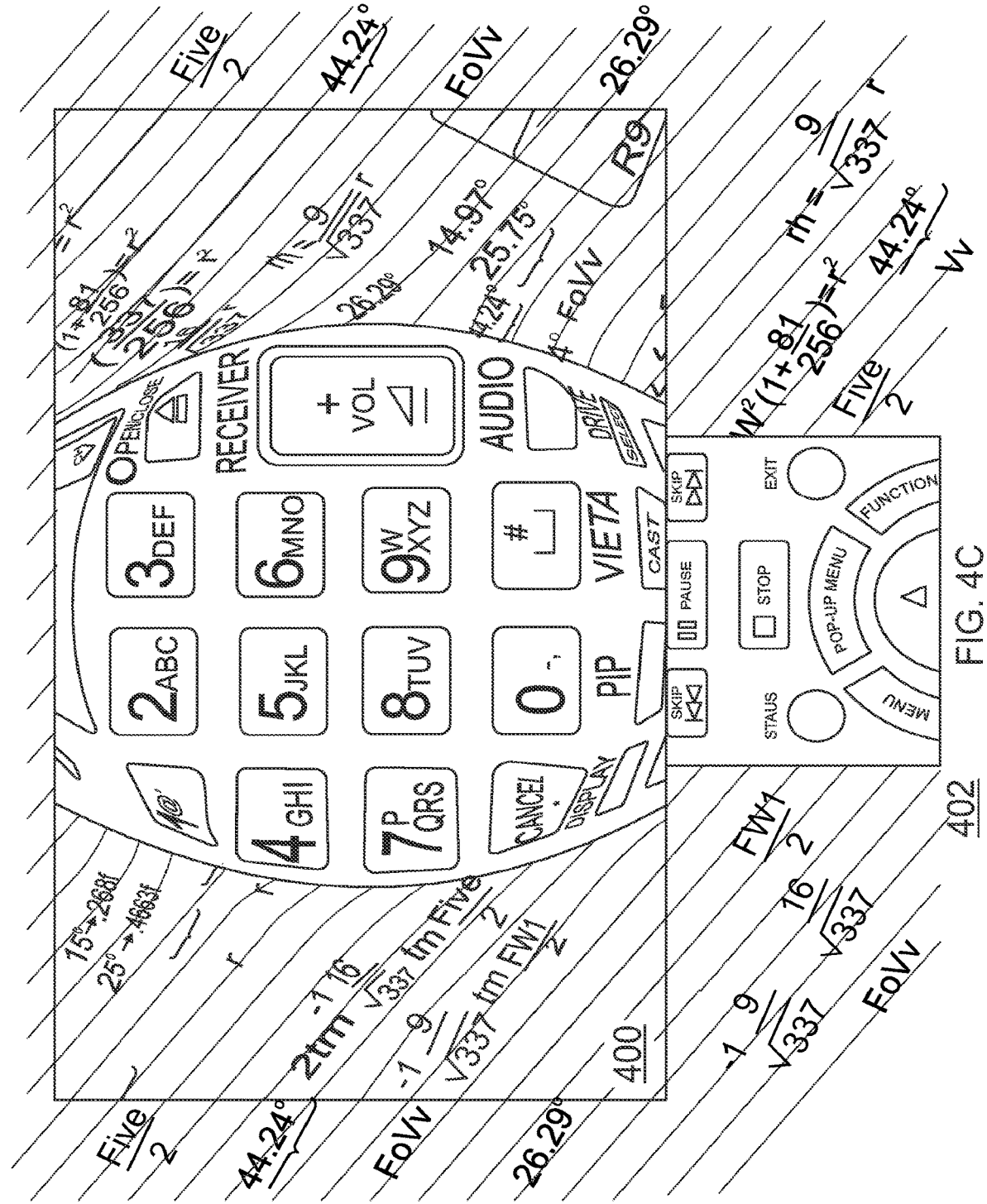
FIG. 4C shows the same view as FIGS. 4A and 4B, but simulates processing that includes central magnification, with seamless transitions between images at the left and right edges of the display and objects outside the display, but only perceptually-seamless transitions between images at the upper and lower edge of the display and objects outside of the display.

Examples demonstrating the use of seamless or perceptually-seamless blending are shown in the series of FIGS. 4A-4C. FIG. 4A is an unmodified view as seen by a user wearing a HST device. Displayed image 400 represents the picture displayed by the display of the HST device with a 50 degree (diagonal) field of view. Object 402 (here shown as a television remote) exists within the displayed image 400 and also extends beyond the displayed image 400 into the user's peripheral vision.

FIG. 4B simulates the view seen by a wearer of a HST device adjusted for seamless blending between images at the edge of the display and objects outside the display. The blending can be based on nonuniform magnification via image coordinate remapping. For example, the central part of the display is magnified but the content as the edges of the display exactly matches the original, unprocessed view (type C light rays that are blocked) so as to align with content or objects outside the display region (type A and B light rays that reach the retina). This provides the magnification required to counteract low visual acuity, but maintains both image continuity and overall field of view to aid in navigation and orientation. In FIG. 4B, it can be seen that the portion of the object 402 within the displayed image 400 is magnified. However, the magnified image of object 402 is seamlessly blended at the edges of the displayed image with the actual object 402 as it extends beyond the displayed image 400 and into the user's peripheral vision.

In FIG. 4C, the requirement for blending pictures displayed by in the displayed image 400 with objects in the user's peripheral vision is relaxed at the top and bottom edges, further enhancing legibility without reducing field of view or the horizontal continuity that is crucial for reading tasks. Upper and lower continuity are not as necessary for this task, even when scanning upward or downward, so the image mapping still appears perceptually seamless. For didactic purposes, FIGS. 4B and 4C adequately capture the gross appearance and basic characteristics of the total visual field imprinted onto the retina by the HST device. The static nature of the drawings belies a vitally important and thoroughly novel aspect of the HST-specific combination of actively-generated central imagery (from the internal display), passively-collected peripheral imagery (type A and B light), and the tapered processing of the active display that smooths the transition between regions.

The partitioned hybrid configuration leverages distinct characteristics of its disparate regions to synergistically stimulate multiple aspects of the wearer's nervous system, with results that are especially advantageous to low-vision users.

A description of the complex neural- and sensory-system interplay engendered by HST partitioning, processing, and hardware follows. First, note that the HST central visual field has all of the characteristics of a VR display. Most significantly, it is essentially disconnected from reality by hardware-induced artifacts including camera update rate, motion blur, and latency. In contrast, the peripheral area has absolutely no latency associated with it. Humans are very sensitive to discrepancies between their own motions, expectation of other motions, and delayed visual perception of said motions—in part, this leads to the motion sickness, vertigo, nausea, and general unease commonly associated with VR and VST AR devices. Despite the presence of such delays in the HST, however, users do not suffer from VR-induced discomfort because the neural system responsible for unconsciously maintaining a sense of spatial orientation by reconciling proprioceptive and visual stimuli automatically ignores the central region and locates the portion of the retinal visual field that is properly correlated with the wearer's expectations concerning kinematics and motion; this internal process of extracting cues for confident equilibrium succeeds even though undelayed (type A/B) light rays only create low-resolution images on the lower-acuity peripheral areas of the retina.

Meanwhile, voluntarily-controlled parts of the brain continuously analyze the higher-acuity central visual field upon which the user is consciously concentrating and is able to recognize and accommodate the delay and other artifacts. Low-vision users with damaged or scarred retinas naturally (or with training) learn to adjust their viewing so that a preferred retinal locus (PRL) with relatively-better acuity receives their focus-of-attention (and hence the central, enhanced image from HST AR) so the above description still applies even with this style of "off-center" viewing. The final aspect of HST, a gradual taper in processing so that the active display smoothly blends into the periphery, is included to prevent jarring transitions from drawing conscious attention to discontinuities that might be distracting; since that periphery is always in a low-acuity/low-resolution portion of the total visual field, a perfect match is not needed and perceptual-seamlessness becomes practical with little effort. Small discrepancies in alignment that arise due to user-specific variations in inter-pupil distance and facial features are also present unless meticulous measures are taken to eliminate them, but are likewise essentially imperceptible.

Figure 5B:
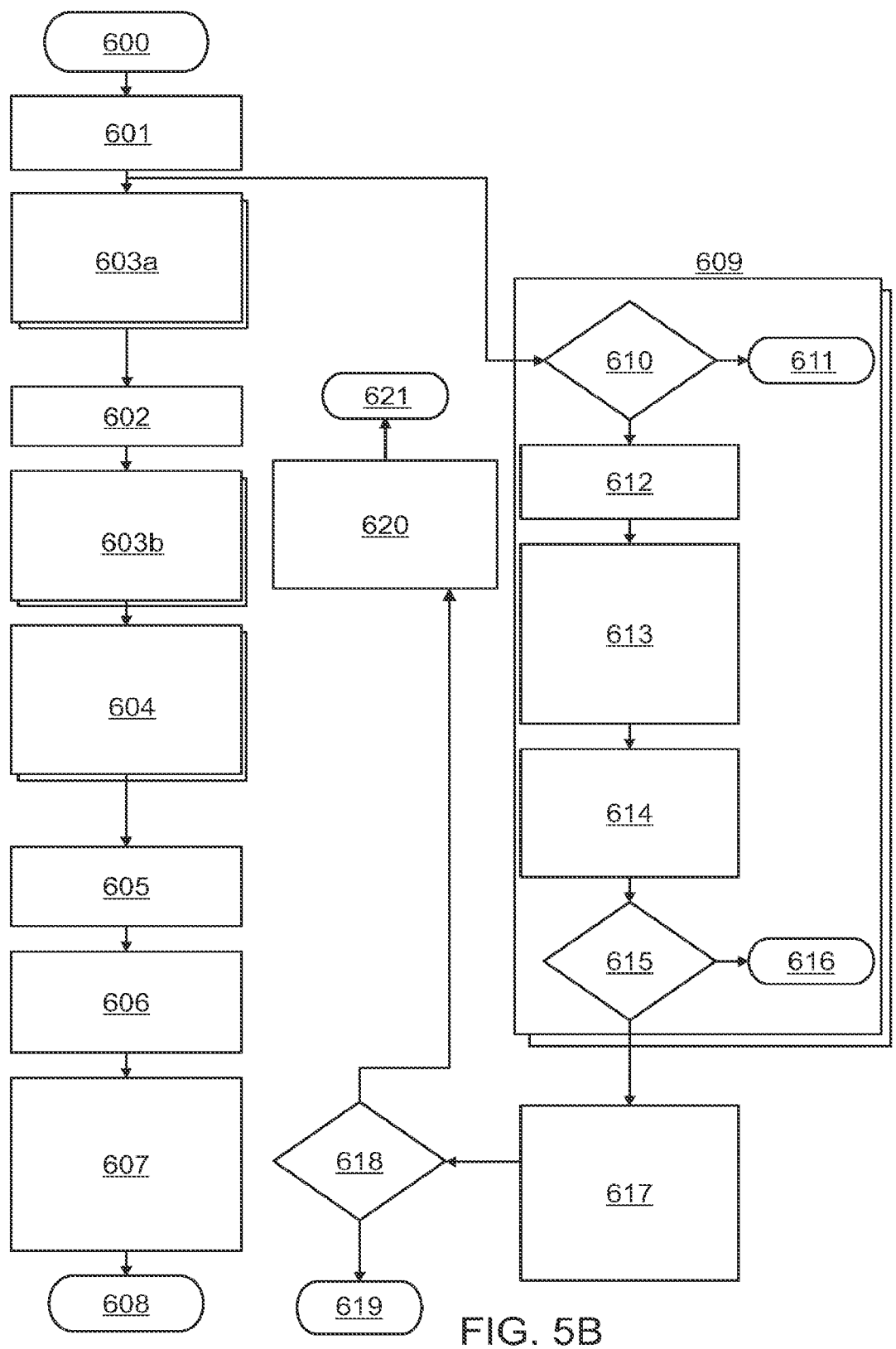
FIG. 5B is a high-level flowchart showing the most significant parallel and sequential steps that occur in a HST device in order to perform effective low-vision processing.

FIGS. 5A-5B show how tailored processing is integrated into a complete HST device. FIG. 5A is a high-level block diagram focusing on data types and dataflow, while FIG. 5B presents a flowchart that emphasizes processes and sequences. Together, the two give a more comprehensive overview because they contain both overlapping and complementary information.

In FIG. 5A, raw video camera images (551) originate from a Camera (500) and enter an image-processing pipeline that performs zero or more configurable modifications by Pre-transformation Enhancement blocks (502*a*) to produce a pre-transformation enhanced image (554A), arbitrary coordinate transformations (suitable for uniform or non-uniform magnification as well as blending) of the image via a Transformation block (501) to produce a transformed and/or remapped image (553), zero or more configurable modifications by Post-transformation Enhancement blocks (502*b*) to produce a post-transformation enhanced image (554B), and optional addition of text and other annotative graphics by Overlay blocks (503) yielding the final image (555) that will be presented to the wearer on the Display (504). Processing blocks (502*a*), (502*b*), and (503) are directly controlled by a collection of device modes, states, and parameters (509) that are distributed (560) to the various blocks that depend on them.

The configuration parameters in (509) originate in a nonvolatile Configuration Database (512) that provides persistence of user-specific preferences and calibration data, including for example a preferred amount of edge or contrast enhancement, a required amount of magnification to complement the user's prescription, and control settings for all other features and operations. A Configurator process (511) initializes these parameters at startup, allows interactive adjusting for calibration or tuning purposes, and manages the transfer of stored or updated configuration (561) to and from the Configuration Database (512), and manages the transfer of saved or updated configuration (560) to and from the active configuration parameters (509). Included among the parameters stored and manipulated by blocks 509, 511, and 512 is any software-controlled occlusion information for dynamically-adjustable and customizable HST occlusion, where the specific occlusion opacity, location, and boundary are stored and adjusted to improve viewing geometry so that it accounts for idiosyncrasies in facial structure, eye position, and relative placement of the HST device (e.g., height upon the nose) and its display.

Raw camera images (551) are also routed to zero or more optional Autonomous Analysis/Modeling/Decision processes (505) that issue autonomously-derived control directives (558) without user input based on image (551) contents, environmental and motion sensor data plus other useful data (556) from ancillary sensors or data sources (506), current and historical device state and parameters (509, over distribution pathways 560), and current and historical direct user inputs (557) provided on interactive user controls (507). Because all autonomous processes (505) make decisions and issue control directives independently of each other and of the user, an Arbitrator (508) is necessary to set priorities and resolve conflicts in order to produce a consistent final set of arbitrated changes (559) to the complete set of device modes, state, and parameters (509).

Unlike Enhancement (502a, 502b) and Overlay (503) operations, the single Transformation (501) block does not have control parameters that are directly adjusted. Instead, Transformation (501) uses a quasi-static map (552) as a template for the transformation process. This map has the same dimensions as the camera image (551) and comprises an implicit non-parametric and non-procedural description of the exact remapping transformation to be performed. It is essentially a lookup table that uniformly accommodates standard magnification, tapered magnification for blending, and any type of deliberately controlled distortion—hence all remappings and distortions, including leaving the raw camera image unchanged, are subjected to identical operations and computations regardless of their complexity. The map (552) is constructed on-demand by a Map Builder (510) that recomputes its lookup table only when its contents change, as determined by arbitrated updates (559) to relevant portions of the device mode, state, and parameter collection (509).

FIG. 5B also depicts the image processing chain, but as an ordered sequence of states. Each frame begin in state 600, captures a new raw camera image (551) in state 601, serially applies zero or more pre-transformation enhancements (502a) in state 603a, applies the current transformation map (552) in state 602, serially applies zero or more post-transformation enhancements (502b) in state 603b, draws zero or more overlay graphics (503) in state 604, and shows the final image (555) on the display (504) in state 605. Also performed every frame is an update (state 606) of ancillary data (556) to the most recently available values from their sources (506), followed in state 607 by an update of all device modes, states, and parameters (509) based on the most recently accepted changes (559) from the Arbitrator (508); this includes updating the HST occlusion region if it is dynamically adjustable and has been changed (e.g.) by the Configurator (511). At that point, per-frame processing concludes in state 608.

In parallel with the per-frame video processing, additional operations take place. The autonomous processes shown as block 505 of FIG. 5A are expanded into block 609 of FIG. 5B. Any number of these processes can exist, with each operating independently of all others. Each employs state machines, heuristics, Artificial Intelligence, Machine Learning, or a hybrid or ad hoc approach to model and anticipate the user's needs or desires and thence autonomously control the HST device by directing changes to its mode, state, or parameters. Every process is highly customized to its task, but all incorporate the high-level steps enumerated inside block 609.

First, a decision (state 610) is made regarding whether the process needs to analyze the most recent video frame; if not, then that particular process is completed (state 611). Otherwise, the autonomous process will analyze the image to extract features or discover information (state 612), then update its internal model of the world, user, and/or device based on the image contents, ancillary information, user actions (current and historical), device state (current and historical), prior decisions, and any other available information (state 613). It then uses this model to decide what change to the device mode, state, or parameters is needed (state 614). A decision is made based on whether any changes are needed (state 615). If no changes are required, the autonomous process can terminate (state 616); otherwise, its requests will be considered by continuing to state 617.

Arbitration in state 617 is a rendezvous point that synchronizes all autonomous processes with the main image processing pipeline. When all autonomous processes have either requested changes or terminated, the Arbitrator (508) will resolve any conflicts (including those resulting from direct user inputs, 557) and ensure that its arbitrated changes (559) will leave the device in a coherent and useful condition. State 618 then determines whether the accepted changes would require an update to the transform map (552)—if so, the map is rebuilt in state 620 based on the applicable mode, state, and parameters (560) before computations terminate in state 621; otherwise, termination is immediate (state 619).

In the descriptions above, it is noted that some boxes or states (viz. 502a, 502b, 503 for FIGS. 5A, plus 603a, 603b, and 604 for FIG. 5B) represent the serial application of zero or more operations. This is a hallmark of the layered implementation approach that allows individual enhancements or analyses to be developed independently and later composed in arbitrary fashion when the device is being operated. The output of any such operation becomes the input of the next, without regard to the internal details of either. Thus, dynamic configuration to customize operation of the device extends beyond real-time manipulation of control parameters to include dynamic re-configuration of the entire pipeline; processing capabilities can be added or removed at any time to optimize consumption of computing and energy resources. Application of these operations is partitioned into pre-transformation and post-transformation groups (502a vs. 502b, and 603a vs. 603b) so that arbitrary and optimized orderings of all operations including transformation (503, 602) can be established; although arbitrary operations can be placed in either group, some operations such as edge enhancement are scale-sensitive and cannot be relocated after the transformation without detracting from performance. Thus, pre-transformation enhanced images (554a) incorporate processing that is order-dependent and cannot be applied after transformation (503, 602) while post-transformation enhanced images (554b) include the totality of all applied processing.

Functionality provided by this library of interchangeable processing modules includes common image processing operations such as contrast stretching (either static or data-dependent), contrast enhancement, color remapping (whether to ameliorate color-blindness or enhance viewing), binarization to black-and-white, posterization to a reduced palette of colors, and edge-detection or edge-enhancement. The common characteristic of all of these types of processing is that they make adjustments to their input image in order to produce an enhanced output image. Any function from commonly-available image processing or photo enhancement software running on a desktop computer is amenable to this methodology and hence represented by boxes 502a, 502b, 603a, and 603b.

The processes represented by boxes 503 and 604 can also be combined in any order (or completely omitted), but they simply add graphical overlays into the final output image. Each one detects classes of shapes or objects in the image in order to call attention to them. The modified image does not form the input to the next process, because each process needs to analyze the underlying image without any stray annotations. Though not explicitly shown in the figures, this means that although the introduction of overlays is a serial process, the computations that produce said overlays may be parallel and in fact can base their outputs on intermediate processed images from earlier processing stages, including not only outputs from the various stages of 502a/603a and 502b/603b but also the original source image (551). Functionality provided by boxes 503 and 604 include locating and marking moving objects in the periphery, noting changes in depth (e.g. stairs), finding signs with readable text, highlighting signs with specific text (e.g. warnings), and detecting faces (whether known to the user or unknown).

Unlike the enhancement (502a, 502b or 603a, 603b) and overlay operations (604), the transformation process (501, 602) is shown as a single entity. Regardless of the complexity of the transformation selected—whether it performs simple magnification, nonlinear magnification with blending, or leaves its input unchanged—the time and energy cost of performing the transformation remains constant. This is true even when multiple transformations are required, because they can be combined and reduced to a single aggregate transformation. All maps (552) used as templates result in an identical set of computations but with different data.

This implies that the Map Builder (510) may require complex calculations in order to create that template. Although true, the impact is greatly tempered by the decoupled construction and application of the map. Map contents only require computation when the map changes, which is relatively rare since they occur at human-driven timescales. Even then, latencies of several frames can be tolerated before becoming perceptible to human users, allowing computations to be amortized over a long period of time for lower peak power consumption and CPU usage.

The most straightforward implementation of the Transformation (501, 602) would compute and apply the desired remapping on a pixel-by-pixel basis for every single displayed frame. Effectively, the entire map would be recomputed on every frame. This is a wasteful but widely-used technique that leverages readily-accessible hardware acceleration via the GPU resources found on typical commodity embedded systems used for AR. For the approach documented here, the GPU is still a viable and generally desirable implementation target for computing maps because it allows specification of the map-building algorithm as a software-like process in the form of a graphics shader or compute shader using OpenGL, OpenCL, Vulkan, DirectX, SYCL, or other standard forms that provide an abstraction layer over GPU hardware resources. Here, however, the decoupled creation and use of the template is much more efficient, reducing the likelihood of the GPU becoming temperature-throttled or oversubscribed.

The purpose of the map is twofold. Primarily, it tailors the user's retinal image by strategically relocating and reshaping visual information from the camera image when projected onto the retina. A secondary goal is to incorporate the tapered blending that integrates with HST. A broad variety of maps are included in an HST device for low-vision users, supporting device modes that provide configurable parameters with specific interactive behaviors and appearances. Most users will select a small number of modes and their accompanying maps from the available gamut, using them on a regular basis to improve their ability to perform daily tasks. FIGS. 4B and 4C have already shown one example of the operation of an HST mapping. Following is a more general treatment of implementation details.

The map is a mathematical function that transforms a source FOV (captured by a camera) to a destination FOV (as presented on a display). The resulting transformation can move visual information from an arbitrary position in the source to an arbitrary location (or locations) in the destination. Mathematically, this is summarized by the equation $(\hat{x}, \hat{y}) = m(x, y)$; i.e. destination coordinates $(\hat{x}, \hat{y})$ can be computed for any given pair of source coordinates $(x, y)$ by applying the vector function (i.e. mapping) named m. Associated with each practically-useful m is an inverse map denoted $m^{-1}$ that transforms destination coordinates back to source coordinates: $(x, y) = m^{-1}(\hat{x}, \hat{y})$. Ultimately $m^{-1}$ and m are both simply maps, having the same implementation; however, the relationship is noted here since maps used for HST devices are actually inverse mappings to support efficient GPU implementations which only compute values at exact output (display) pixel coordinates.

In low-vision HST devices, these two-dimensional mappings introduce carefully controlled distortion to emphasize certain portions of the image spatially while maintaining its overall coherence and recognizability. They can be customized to the unique detailed needs of individual users, providing emphasis or enhancement to multiple areas of any shape or location within the source visual field. While there are no fundamental limits placed on the nature of a mapping m, it is also desirable to provide immediate utility to a broad class of users without requiring the measurement or training processes that accompany customization. Useful constraints that help with these goals are continuity and radial symmetry. Continuity avoids abrupt transitions that are visually jarring or distracting, and preserves the connectedness of image contents even in the presence of deliberately-introduced distortion. Radially symmetric mappings are those which, when expressed in polar coordinates (radius r and angle a) instead of Cartesian coordinates (x and y), have a simple form that does not depend on the angle. Hence the entire two-dimensional map is defined by the one-dimensional equation $\hat{r} = m(r)$, where radii r and $\hat{r}$ measure the distance from the center of their respective input and output images. These radially symmetric functions are intuitively useful even though they can only adjust the mapping based on distance from the center of the image; the more general full two-dimensional mapping can accommodate (e.g.) off-center regions, square or elliptical regions, regions that follow user-specific contours or boundaries of constant visual acuity, or blended combinations of multiple regions—without increasing implementation complexity or resource consumption. For users with a complete but localized loss of vision due to (e.g.) retinal damage, a useful class of mappings provides warping that pushes pixels, the center of the picture, radially outward from the damaged areas, distorting the view but restoring the visibility of obscured objects by flowing the image around the damaged retinal cells. As stated, warping can be any form of pixel or image remapping and may include, but not limited to, warping from the center or any location to another location, non-linear transformations, partial magnification, blending and nonsymmetrical image reconstruction.

Figure 7A:
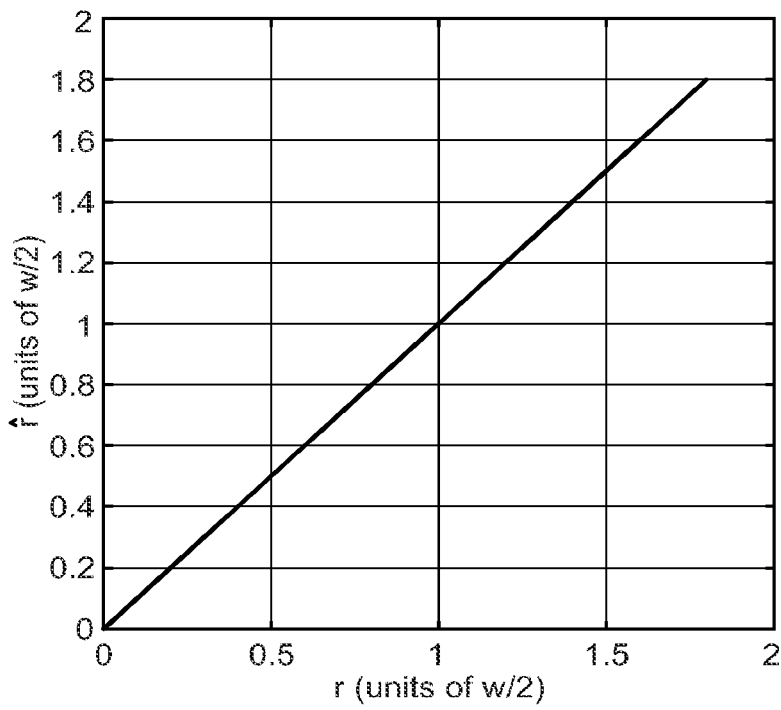
FIG. 7A depicts the graph of a radially symmetric mapping function where the mapping is the identity transformation.
Figure 7B:
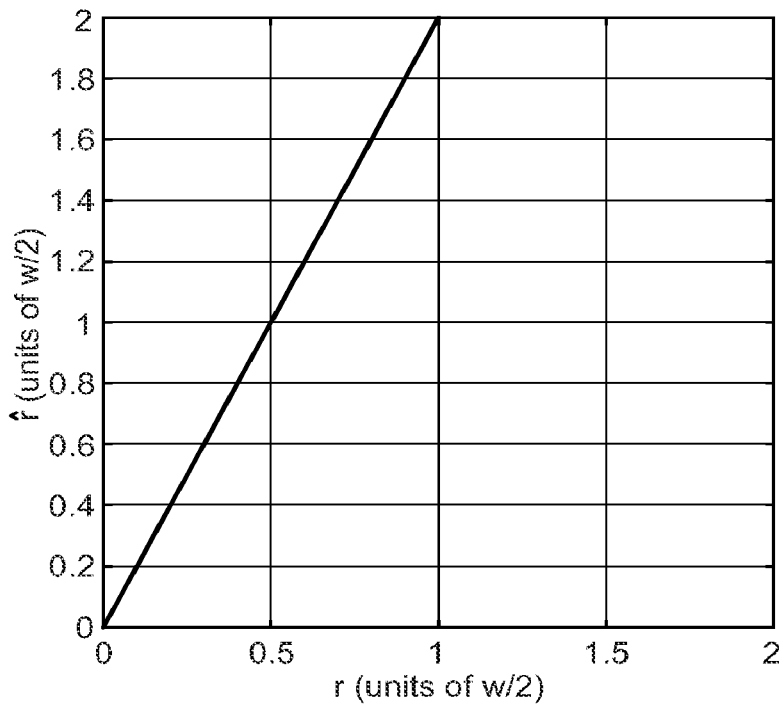
FIG. 7B depicts the graph of a radially symmetric mapping function where the mapping provides a uniform magnification of 2×.

FIGS. 7A-7B illustrate two of the simplest radial mappings. Throughout all sub-figures of FIGS. 7A-7B, h and w respectively denote the height and width of the display in pixels. In FIG. 7A, the mapping is the identity function $\hat{r}=r$, which results in no changes to an image because pixels at source radius r remain unmoved at destination radius r; this corresponds to the sample processing result illustrated in FIG. 4A. In FIG. 7B, $\hat{r}=2r$, resulting in pure magnification by a factor of two.

Figure 7C:
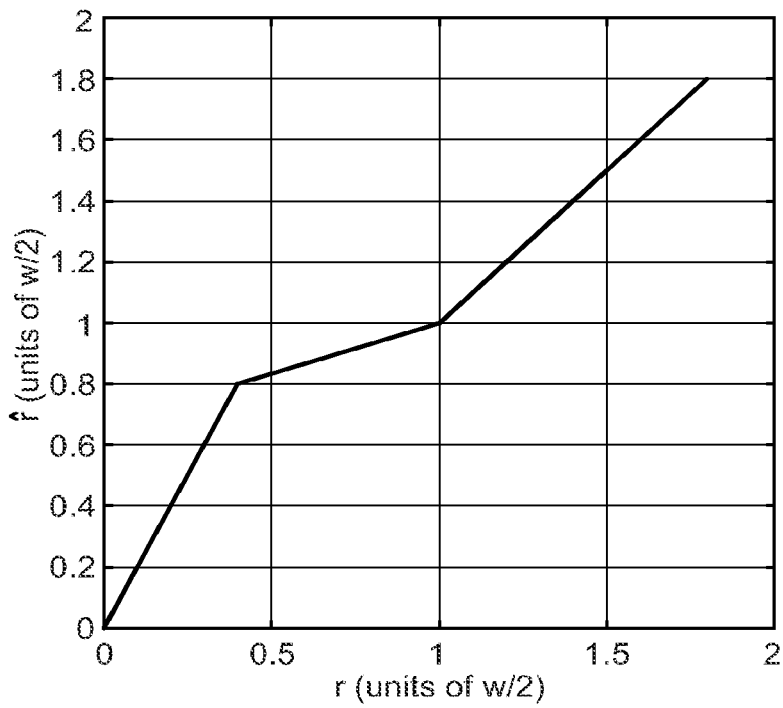
FIG. 7C depicts the graph of a radially symmetric mapping function corresponding to the perfect seamlessly-blended HST mapping illustrated in FIG. 4*b*, with uniform central magnification of 2× tapering to no magnification at the periphery.

While FIG. 7A depicts a seamlessly-blended HST map, FIG. 7B does not. For perfectly seamless blending with smooth functions, it is necessary that $\hat{r}=r$ for $r \geq w/2$. FIG. 7C shows how the curve in FIG. 7B can be changed to the seamlessly-blended HST map corresponding to FIG. 4B. For values of $r \leq 0.4w$, the function defining the map is a straight line with slope equal to 2.0, corresponding to uniform central magnification by a factor of two. For $r \geq w/2$, the map is a straight line with slope equal to 1.0 passing through $(r=w/2, \hat{r}=w/2)$ as required by the above constraint. Between these two limits, there is a smooth and gradual transition (also a straight line segment, but not representing linear magnification since the extended segment would not pass through the origin). The entire FOV is preserved when changing from FIG. 4A to FIG. 4B with this mapping: even though there is uniform magnification in the center of FIG. 4B, all of the original image content remains visible, albeit with some distortion in the periphery. Thus, this mapping strategically provides structural emphasis (in the form of magnification) to the part of the image that will command active attention and interact with the higher-acuity central portion of the retina while still providing the full FOV as context for navigation and orientation as well as maintaining the smooth transition for HST.

Figure 7D:
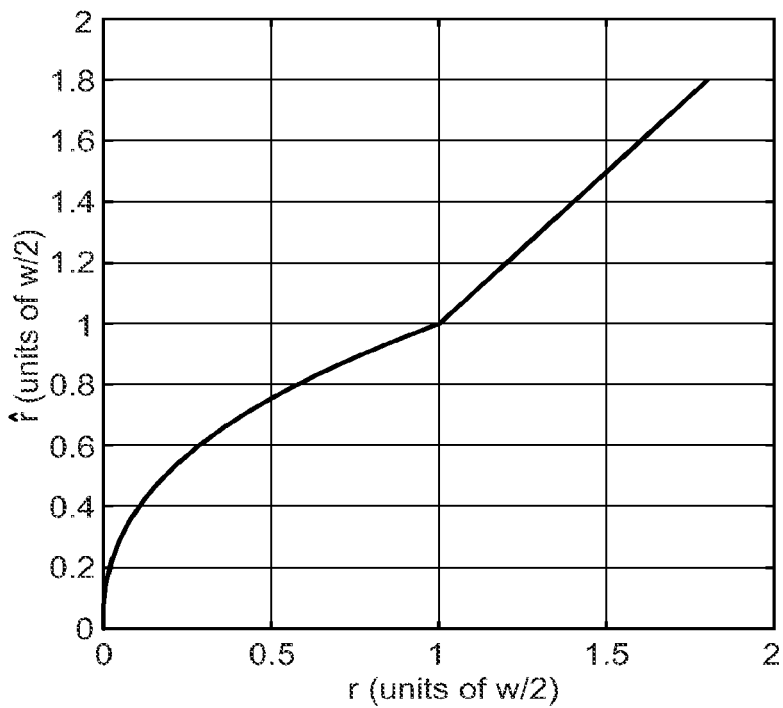
FIG. 7D depicts the graph of a radially symmetric mapping function providing a non-uniform nonlinear magnification profile over the central visual field, with seamless blending suitable for a HST device.

The specific mapping shown in FIG. 7C is an instance of the general inverse map equation:

$$r = m^{-1}(\hat{r}) \begin{cases} \dfrac{\hat{r}}{g} & \text{for } \hat{r} \leq r_0 \\ \dfrac{r_0}{g} + \dfrac{\hat{r}-r_0}{r_{max}-r_0} \cdot \left(r_{max} - \dfrac{r_0}{g}\right) & \text{for } r_0 \leq \hat{r} < r_{max} \\ \hat{r} & \text{for } \hat{r} \geq r_{max} \end{cases}$$

where g is the amount of central magnification (here, $g=2.0$ for 2× magnification), $r_0$ is the radius of the centrally magnified area (here, $r_0=0.4w$), and $r_{max}=w/2$. This formulation is particularly versatile because it allows a small number of intuitive control parameters to be adjusted to accommodate viewing with different magnification factors, different sizes of centrally magnified areas, and different transition regions. By setting $r_{max}>w/2$ it is also possible to relax the seamless-transition requirement, obtaining only perceptual-seamlessness but other mappings have different central, outer, and transition region characteristics as evidenced in FIG. 4C. Each brings a different tradeoff among aesthetic appearance, amount and type of distortion, computational complexity, ease of control, and other factors. Another example that exhibits perfectly seamless HST transitions is given in FIG. 7D. This graph shows a continuously-varying nonlinear magnification map with no straight line segments except where $r \geq w/2$—there is distortion similar to a fisheye lens at every point within this radius.

Elimination of Focus Ambiguity

For sections of the field-of-view that coincide with the projected internal display (i.e. the same sections viewing the replacement image), the direct optical light path from the scene to the retina is blocked in HST. This can be accomplished by occluding the scene-facing portion of the optical combiner or any location in the optical processing chain that is upstream from the point or location where the external and internal light paths merge. Analogous locations and procedures for blocking this light can be implemented for other optical configurations including those involving birdbath optics, direct laser projection, or electronic contact lenses. It is important to note that only the portion of the combiner (or other applicable upstream, scene-facing optical component) that will directly superimpose its eye-facing output image with the internal display image should be blocked, because the surrounding region can contribute significant peripheral vision.

Recall that traditional AR operations in the OST regime allow light from the scene to travel directly to the retina and form a natural image there; the internal display can then be used to overpower this natural image so that augmentations are visible to the user. In this present low-vision application, it is desirable to overpower the entire scene (within the active display limits) with an enhanced (and generally magnified or otherwise transformed) replacement.

Typical OST AR hardware is easily capable of producing a bright enough image to overwhelm the natural scene image under practical lighting conditions. For users with normal vision, this is a perfectly reasonable operating mode since they will only perceive a single dominant image, and HST as described above is viable without blocking type C light from reaching the retina. For many low-vision users and even some otherwise normally-sighted individuals, unfortunately, this does not hold true.

To understand why, consider the task of reading a book while using OST glasses without any additional magnification and without blocking any direct light path. Normal reading distance without AR gear is 16-24 inches and requires accommodation of the lens within the eye to focus a legible image on the retina. The output from the internal display on AR glasses is typically collimated to appear to be originating from a distance of 8-10 feet, allowing the eyes to relax and avoid eyestrain. Without blocking the direct light path, there will be two superimposed images formed on the OST AR user's retina—the natural image focused in the near field, and the display image focused in the far field.

Users with normal vision can readily select between the two nearly identical images, shifting focus at will. In test sessions, however, low-vision users exhibited poorer reading ability even when camera images clearly showed increased contrast: they are unable to detect and exploit the contrast cues that normally-sighted individuals use to drive their focus response to completion, and hence are not able to focus successfully on either competing image. Problems were also noted in non-reading tasks involving intermediate-distance viewing.

Figure 6A:
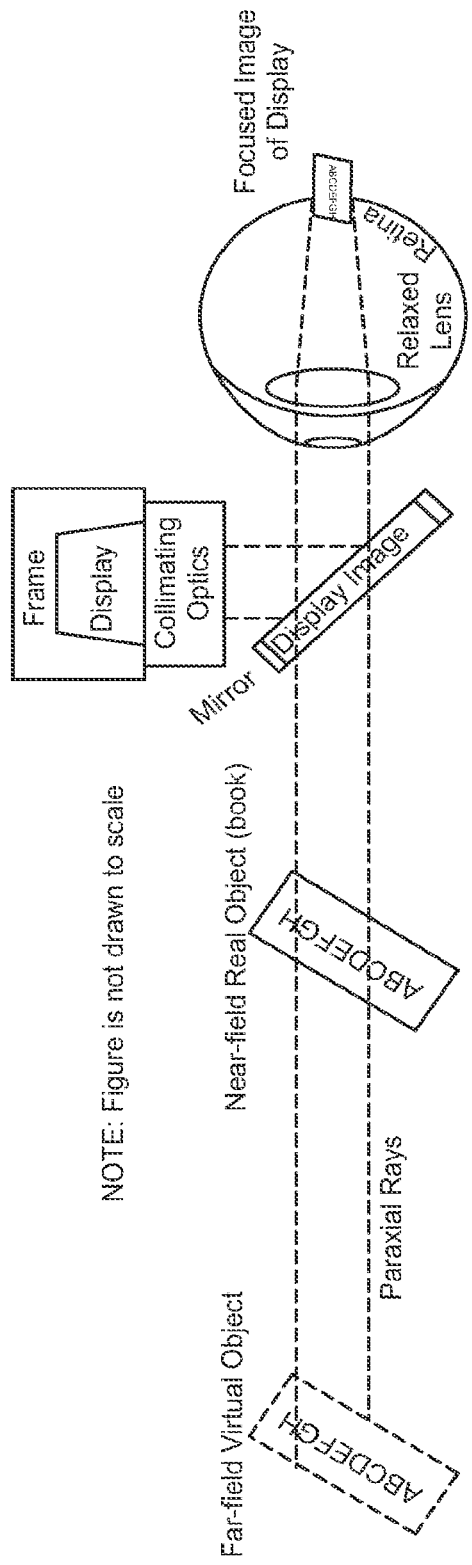
FIG. 6A (not to scale) demonstrates how a normal human eye can focus the image from an embedded AR display onto the retina using distance vision while viewing a near-field object at typical reading distance of 16-24 inches.
Figure 6B:
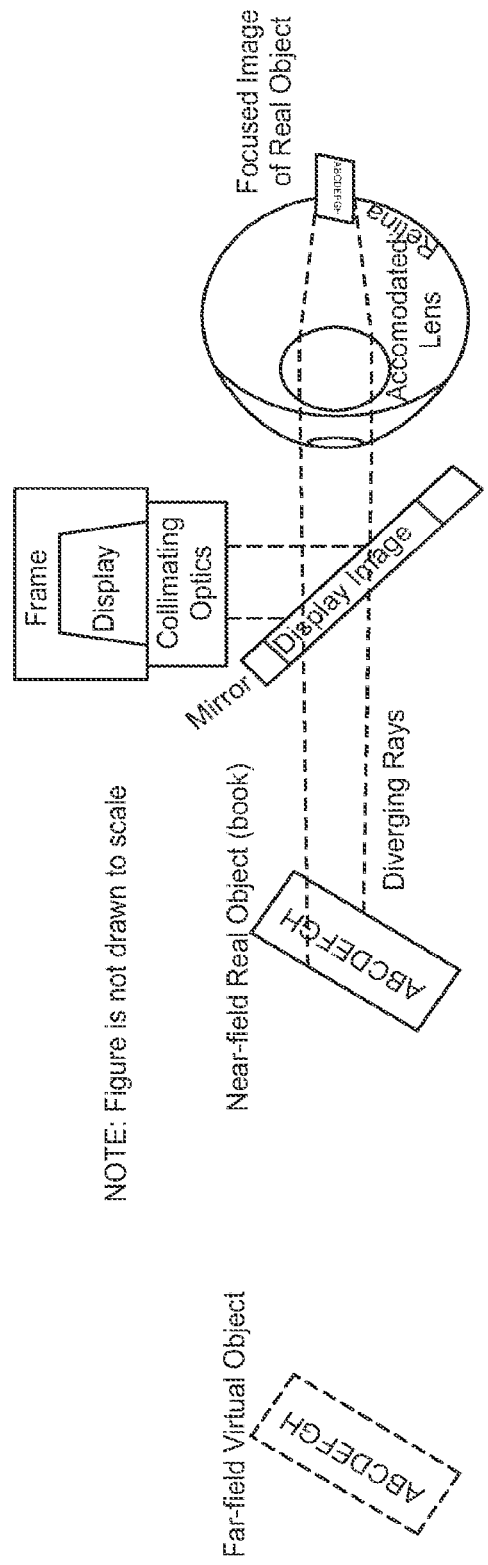
FIG. 6B (not to scale) demonstrates how a normal human eye can focus the image of a near-field object onto the retina using near vision while wearing a HST device that simultaneously display a far-field object at larger distances.

FIGS. 6A and 6B (neither drawn to scale) illustrate the situations described above for a user with normal eyesight and OST AR hardware.

In FIG. 6A, the eye is shown with a relaxed lens that only focuses light from relatively distant image sources onto the retina. Because of this, light emanating from the physical book in the near field—type C light rays—is not perceived by the user. Even though the display typically sits only a few inches from the eye (and potentially much closer with alternative technologies such as an electronic contact lens), a collimating mechanism (shown here as discrete collimating optics, though they could be considered to be part of the display assembly) refract its light into nearly parallel (paraxial) rays that appear to be emanating from a virtual object much farther away. The eye in FIG. 6A sees only the image on the internal display, and it is in perfect focus.

In FIG. 6B, the eye is shown in an accommodated state with a more convex lens shape for near vision. This shape captures the diverging (non-parallel) type-C light rays from the book and focuses them onto the retina to form a coherent image. Paraxial rays from the display are not coherently focused, so they are ignored. The eye in FIGS. 6A-6B sees only the naturally-formed image of the book, and it is in perfect focus.

Most normally-sighted users can switch between the two lens configurations depicted by FIGS. 6A-6B at will, quickly achieving stable focused vision even when starting from an unfocused intermediate state. This process, which is partially reflexive and partially voluntary, involves a feedback mechanism that continually adjusts the lens in a direction that produces greater contrast and clarity until a satisfactory focus is recognized.

For low-vision users, reduced visual acuity degrades contrast and clarity such that incremental changes in lens shape have less noticeable impact on image quality. This impedes the feedback mechanism: the direction of better focus quality is less readily determined since the image will always remain blurred. Because any adjustment to the lens (in either direction) always improves the focus quality of one image while penalizing the other; having competing images that are nearly identical introduces additional ambiguity. The problem persists when the two images are different (e.g., if the displayed image is subjected to magnification or other processing), even when the displayed image has been enhanced for easier viewing by low-acuity users.

HST solves the problem by blocking the direct light path to eliminate the choice between competing focus distances, guaranteeing that the processed image is always selected. This also allows the eye to operate exclusively with a relaxed lens, avoiding eyestrain even when reading or viewing near-field objects.

Occlusion Implementation

The conventional approach to low-vision AR devices concludes that external light is undesirable and must be completely blocked, resulting in the adoption of VST AR over OST AR. For users, this leads to total immersion that is essentially Virtual Reality with its concomitant detrimental effects on equilibrium and mobility. By understanding the ramifications of the three aspects described above, it becomes clear that blocking only the direct external light path that coincides with the internal display image on the retina is sufficient to alleviate the problems associated with OST AR in low-vision applications while preserving peripheral vision and equilibrium. It is equally important for areas which do not contribute imagery from the internal display onto the retina to remain unblocked, and even more critical that such an unblocked area be incorporated in the physical architecture of the OST AR device with sufficient size to support the pathway for natural light that the human brain depends upon for equilibrium and confident reference to the environment.

Physical implementation of HST include an appropriately-shaped physical barrier that prevents external scene light from impinging on areas of the retina that sense the internal display image; the negative space of this barrier implicitly enables the perceptually-seamless blending and external reference aspects. This physical barrier can be formed any suitably opaque material, including plastic, vinyl, silkscreen, metal, ink, paint, dye, or even an appropriately-polarized liquid crystal. The degree of opacity need not be complete, as it is only necessary to bias the user's visual system toward focusing on the internally-displayed image in favor of the external light rays; the critical opacity threshold for achieving this will vary across individuals, but relatively dark occlusions that block at least 90% of external light will be suitable for the vast majority of users. However, the exact amount of opacity is not only dependent on the user but also dependent on the display technologies as well and includes blocking 100% and 90% of external light, but may also include blocking at least 50%, at least 60%, at least 70%, and at least 80% of external light.

Figure 3A:
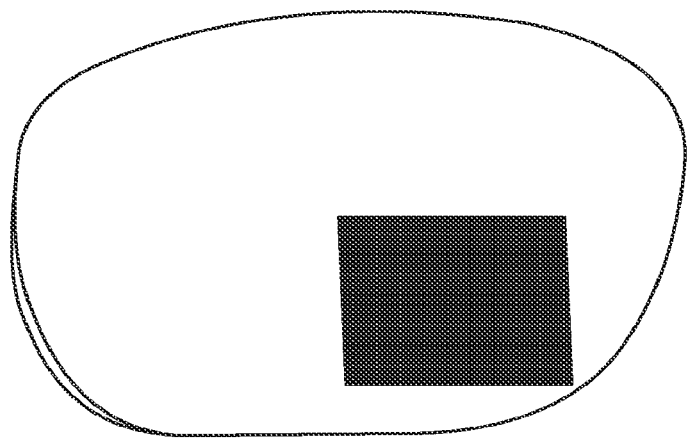
FIG. 3A shows the outer (scene-facing) side of a lens modified with an opaque barrier to support HST for an OST device.
Figure 3B:
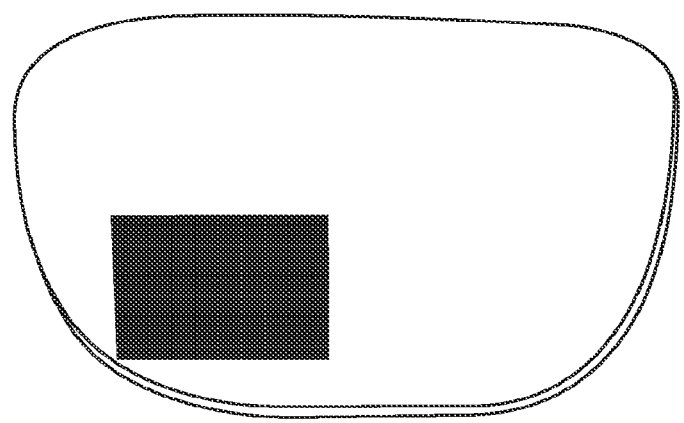
FIG. 3B shows the inner (eye-facing) side of the lens of FIG. 3A.

A simple and effective implementation, suitable for any eyeglass-like device with an outer lens, is shown in FIGS. 3A-3B. Here, a small rectangle of vinyl is attached electrostatically (without adhesive) to the non-refractive protective lens to form the HST barrier. Instead of vinyl, alternatives include tape, paint, ink, and silkscreen or thin pieces of paper, metal, or plastic. When the inner surface of this lens is not used for optical combining, then the barrier can be located on this surface (as in FIGS. 3A-3B) for additional isolation and protection against damage or unintentional adjustments. Full-custom outer lenses can be fabricated with darkened or fully opaque sections of glass or plastic, or with opaque inserts or attachments via friction fit, magnets, adhesive, screws, heat stakes, rivets, or other common attachment method. Since approximate blending is sufficient, barrier placement is not critical and a slightly oversize shape can be used that will give satisfactory performance for a majority of users; a gradual transition from highest opacity at the center to lower opacity near the edges also supports a broader class of users with overlapping but slightly different visual field characteristics. Some implementations (e.g., vinyl or tape) have the advantage of being adjustable.

The location of the physical barrier can vary according to the form of the underlying display. The barrier may be placed at any point in the optical system prior to the location where the natural image (formed from type C light rays) and the internal display image are combined, as long as the path from the internal display is not also blocked. This opens up possibilities for depositing a blocking material (e.g., tape, paint, ink, silkscreen, etc.) on any available pre-existing surface within the AR apparatus as long as the internal display image is not impacted, including for example the outside (scene-facing) surface of an electronic contact lens or internal mirrors/lenses within larger AR devices.

Instead of using an existing surface, physical barriers can also be mechanically inserted and mounted anywhere in the path of scene light as long as display light is not also blocked. These have the potential advantage of being adjustable or customizable to individual users as well as independent manufacture that gives total freedom in construction and material choice. It is generally always possible to create a new outermost lens on an eyeglass-like frame that provides no refraction, but serves only to provide this barrier; this even works for electronic contact lenses, though of course it also introduces the eyeglass frame.

Included in the category of physical barriers is a blockage created by appropriately-polarized liquid crystal, as found in an LCD panel. A convenient implementation would embed this LCD-like structure into a lens within the AR device. Then, electrical fields can be manipulated via electronic controls to customize the specific boundary between transparent and blocked regions, tuning its size and position for each specific user to compensate idiosyncratic facial structure and eye position with respect to the HST device and its display. For ease of manufacture or integration, an LCD panel with this degree of controllability acting as the HST physical light barrier can be larger than the required HST region—even comprising an entire an entire lens, or encompassing the user's entire field of view. These aspects apply to any medium that can be electrically polarized or manipulated to obtain a transition between states having different degrees of transparency. Electronic control gives additional flexibility since the barrier can be deactivated, either voluntarily or automatically when power is lost (for superior fail-safe viewing).

The unique combination of custom processing and hardware design, including an opaque barrier, provides a HST device that leverages the best aspects of both OST and VST AR in a single device. Where the original glasses would function best in traditional overlay-based AR applications, the addition of image processing algorithms that are custom-tailored to magnify, improve, or otherwise manipulate the centrally-visible image while blending seamlessly or near-imperceptibly into the periphery supports the enhancement needs of low-vision while maintaining a natural-width field of view. Working in concert with the novelties of the adjusted hardware configuration, the processing and blending methodologies eliminate not only the equilibrium problems associated with VR (and VST AR) but also the focus ambiguity problems that low-vision users experience with OST AR. The result is a system providing user- and task-specific enhancements, a wide field of view providing the eye with precisely-controlled image details, zero-latency cues needed for confident equilibrium, and a fail-safe vision path in case of hardware failure.

While preferred embodiments of the present disclosure have been shown and described herein, for those skilled in the art such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately"

may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of providing enhanced vision for a low-vision user, comprising:
    preventing a majority of external light corresponding to a central portion of the user's field of view from entering at least one eye of the user;
    allowing external light corresponding to a peripheral portion of the user's field of view to enter the at least one eye of the user;
    obtaining video images with a camera;
    applying image processing to the video images to produce an enhanced video stream that blends into the peripheral portion of the user's field of view; and
    presenting the enhanced video stream on a display positioned on or within contact lenses to the central portion of the user's field of view.

2. The method of claim 1, wherein applying image processing further comprises applying magnification to at least a central portion of the video images.

3. The method of claim 2, wherein a portion of the video stream outside of the central portion is magnified less than the central portion.

4. The method of claim 1, wherein applying image processing further comprises applying contrast enhancement to at least a central portion of the video images.

5. The method of claim 1, wherein applying image processing further comprises applying color mapping to at least a central portion of the video images.

6. The method of claim 1, wherein applying image processing to the video images comprises blending a top edge, a bottom edge, a left edge, and a right edge of the video images with the peripheral portion of the user's field of view.

7. The method of claim 1, wherein applying image processing to the video images comprises blending only a left edge and a right edge of the video images with the peripheral portion of the user's field of view.

8. The method of claim 1, wherein applying image processing to the video images comprises image coordinate remapping to blend the video stream with the peripheral portion of the user's field of view.

9. The method of claim 8, wherein the image coordinate remapping comprises radial mapping.

10. The method of claim 1, wherein presenting the enhanced video stream comprises presenting the enhanced video stream on a display positioned on or within an eyeglasses device.

* * * * *